(12) United States Patent
Sakakibara

(10) Patent No.: US 10,051,221 B2
(45) Date of Patent: Aug. 14, 2018

(54) SOLID-STATE IMAGING DEVICE AND ELECTRONIC APPARATUS

(71) Applicant: SONY CORPORATION, Tokyo (JP)

(72) Inventor: Masaki Sakakibara, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 15/535,827

(22) PCT Filed: Dec. 11, 2015

(86) PCT No.: PCT/JP2015/084740
§ 371 (c)(1),
(2) Date: Jun. 14, 2017

(87) PCT Pub. No.: WO2016/104174
PCT Pub. Date: Jun. 30, 2016

(65) Prior Publication Data
US 2017/0347050 A1    Nov. 30, 2017

(30) Foreign Application Priority Data

Dec. 25, 2014    (JP) ................................ 2014-261700

(51) Int. Cl.
*H04N 5/3745*    (2011.01)
*H04N 5/376*    (2011.01)
*H04N 5/378*    (2011.01)

(52) U.S. Cl.
CPC ......... *H04N 5/37455* (2013.01); *H04N 5/378* (2013.01); *H04N 5/3765* (2013.01)

(58) Field of Classification Search
CPC ...... G01J 1/44; G11C 2207/063; G11C 7/062; H02M 2001/0009; H02M 3/33507
See application file for complete search history.

(56) References Cited

U.S. PATENT DOCUMENTS 9,191,572 B2 *  11/2015  Yang ................. H04N 5/23229
2004/0119627 A1 *  6/2004  Jaussi ..................... H03M 5/20
                                                                341/155

(Continued)

FOREIGN PATENT DOCUMENTS

| JP | 2006-203736 A | 8/2006 |
| JP | 2006-270293 A | 10/2006 |
| JP | 2013-143598 A | 7/2013 |

OTHER PUBLICATIONS

International Search Report prepared by the Japan Patent Office dated Feb. 16, 2016, for International Application No. PCT/JP2015/084740.

*Primary Examiner* — Trung Diep
(74) *Attorney, Agent, or Firm* — Sheridan Ross P.C.

(57) ABSTRACT

The present disclosure relates to a solid-state imaging device and an electronic apparatus that are capable of suppressing reduction in sensitivity. A current comparison unit receives light incident on a pixel, performs photoelectric conversion to generate a voltage, compares a current generated from the voltage with reference to a first potential line and a reference current generated with reference to a second potential line, the first potential line being one of a power supply line and a grounding line, the second potential line being another one of the power supply line and the grounding line, and outputs a comparison. A feedback unit returns a signal to a source side in the current comparison unit when the current is generated, the signal using the comparison result by the current comparison unit. The feedback unit can perform standby control in the current comparison unit.

12 Claims, 26 Drawing Sheets

(56) References Cited

U.S. PATENT DOCUMENTS

| | | | |
|---|---|---|---|
| 2006/0230206 A1* | 10/2006 | Park | G06F 13/4072 710/110 |
| 2008/0094052 A1* | 4/2008 | Shimbayashi | G01R 19/16557 324/76.11 |
| 2013/0290593 A1* | 10/2013 | Slavov | H04Q 3/521 710/305 |
| 2014/0354865 A1* | 12/2014 | Yun | H04N 5/37455 348/308 |

* cited by examiner

SOLID-STATE IMAGING DEVICE AND ELECTRONIC APPARATUS

CROSS REFERENCE TO RELATED APPLICATIONS

This application is a national stage application under 35 U.S.C. 371 and claims the benefit of PCT Application No. PCT/JP2015/084740 having an international filing date of 11 Dec. 2015, which designated the United States, which PCT application claimed the benefit of Japanese Patent Application No. 2014-261700 filed 25 Dec. 2014, the disclosures of which are incorporated herein by reference in their entirety.

TECHNICAL FIELD

The present disclosure relates to a solid-state imaging device and an electronic apparatus, and particularly to, a solid-state imaging device and an electronic apparatus that are capable of suppressing reduction in sensitivity.

BACKGROUND ART

Non-Patent Literature 1 proposes a solid-state imaging device that includes in a pixel a current source and a comparator including two transistors as a core, outputs a comparison result, and performs A/D (Analog-to-Digital) conversion in a counter of a column outside the pixel.

CITATION LIST

Non-Patent Literature

Non-Patent Literature 1: Meng-Ting Chung, et. al, "A 0.5 V PWM CMOS Imager With 82 dB Dynamic Range and 0.055% Fixed-Pattern-Noise," JSSC, IEEE Vol. 48 pp. 2522-2530

DISCLOSURE OF INVENTION

Technical Problem

In the proposition described in Non-Patent Literature 1, however, since the comparison result is detected for each column, it is necessary to perform line-sequential exposure in which exposure and scanning are performed on a line-by-line basis. Therefore, there has been a fear that the line-sequential exposure leads to reduction in sensitivity.

The present disclosure has been made in view of the circumstances as described above and is capable of suppressing reduction in sensitivity.

Solution to Problem

A solid-state imaging device according to one aspect of the present technology includes on a pixel-to-pixel basis: a comparison unit that receives light incident on a pixel, performs photoelectric conversion to generate a voltage, compares a current generated from the voltage with reference to a first potential line and a reference current generated with reference to a second potential line and having a converted voltage of a reference signal referred to for comparison with the current, the first potential line being one of a power supply line and a grounding line, the second potential line being another one of the power supply line and the grounding line, and returns a signal to a source side when the current is generated, the signal using a comparison result inverted when the current and the reference current become identical; and a storage unit that stores, as a digital value, a signal when the comparison result by the comparison unit is inverted.

The comparison unit can include an inverter circuit including a first transistor and a second transistor that are connected in series, the first transistor converting a voltage of the pixel signal to be input and generating a current, the second transistor converting a voltage of the reference signal to be input and generating the reference current.

The comparison unit can further include a logic circuit that returns, when comparison by the inverter circuit is started, low level as a signal using the comparison result, and returns, when the comparison result by the comparison unit is inverted, high level as a signal using the comparison result.

The comparison unit can further include a positive feedback circuit that increases a change speed when the signal of the comparison result is inverted.

The solid-state imaging device can further include on a pixel-to-pixel basis a transfer gate that transfers a signal from the photoelectric conversion unit.

The storage unit is a dynamic latch.

The storage unit is a static latch.

The first transistor is constituted of an NMOS (Negative Channel MOS (Metal-Oxide Semiconductor)), and the second transistor is constituted of a PMOS (Positive Channel MOS).

The first transistor is constituted of a PMOS (Positive Channel MOS), and the second transistor is constituted of an NMOS (Negative Channel MOS).

When the hole is assumed as charge, a polarity of the positive feedback circuit is a reverse polarity in a case where an electron is assumed as charge.

The solid-state imaging device is constituted of a plurality of semiconductor substrates.

An electronic apparatus according to one aspect of the present technology includes: a solid-state imaging device including, on a pixel-to-pixel basis, a comparison unit and a storage unit, the comparison unit receiving light incident on a pixel, performing photoelectric conversion to generate a voltage, comparing a current generated from the voltage with reference to a first potential line and a reference current generated with reference to a second potential line and having a converted voltage of a reference signal referred to for comparison with the current, the first potential line being one of a power supply line and a grounding line, the second potential line being another one of the power supply line and the grounding line, and returning a signal to a source side when the current is generated, the signal using a comparison result inverted when the current and the reference current become identical, the storage unit storing, as a digital value, a signal when the comparison result by the comparison unit is inverted; a signal processing circuit that processes an output signal output from the solid-state imaging device; and an optical system that inputs incident light to the solid-state imaging device.

In one aspect of the present technology, on a pixel-to-pixel basis, light incident on a pixel is received, photoelectric conversion is performed to generate a voltage, a current generated from the voltage with reference to a first potential line and a reference current generated with reference to a second potential line and having a converted voltage of a reference signal referred to for comparison with the current are compared, the first potential line being one of a power supply line and a grounding line, the second potential line being another one of the power supply line and the grounding line, and a signal is returned to a source side when the current is generated, the signal using a comparison result inverted when the current and the reference current become identical. Then, a signal when the comparison result by the comparison unit is inverted is stored as a digital value.

Advantageous Effects of Invention

According to the present technology, it is possible to suppress reduction in sensitivity.

It should be noted that the effects described in this specification are merely illustrative. The effects of the present technology are not limited to the effects described in this specification and additional effects may be provided.

MODE(S) FOR CARRYING OUT THE INVENTION

Hereinafter, modes for carrying out the present disclosure (hereinafter referred to as embodiments) will be described. It should be noted that description will be given in the following order.

1. Schematic Configuration Example of Solid-State Imaging Device
2. First Embodiment of Comparator
3. First Embodiment of Pixel Unit
4. Second Embodiment of Comparator
5. Second Embodiment of Pixel Unit
6. Third Embodiment of Pixel Unit
7. Fourth Embodiment of Pixel Unit
8. Second Embodiment of Latch Unit
9. Fifth Embodiment of Pixel Unit
10. Sixth Embodiment of Pixel Unit
11. First Embodiment of Multi-substrate Configuration
12. Second Embodiment of Multi-substrate Configuration
13. Output Control Example of Latch Circuit
14. Usage example of Image Sensor
15. Example of Application to Electronic Apparatus 1. Schematic Configuration Example of Solid-State Imaging Device FIG. 1 shows a schematic configuration of a solid-state imaging device according to the present technology.

Figure 1:
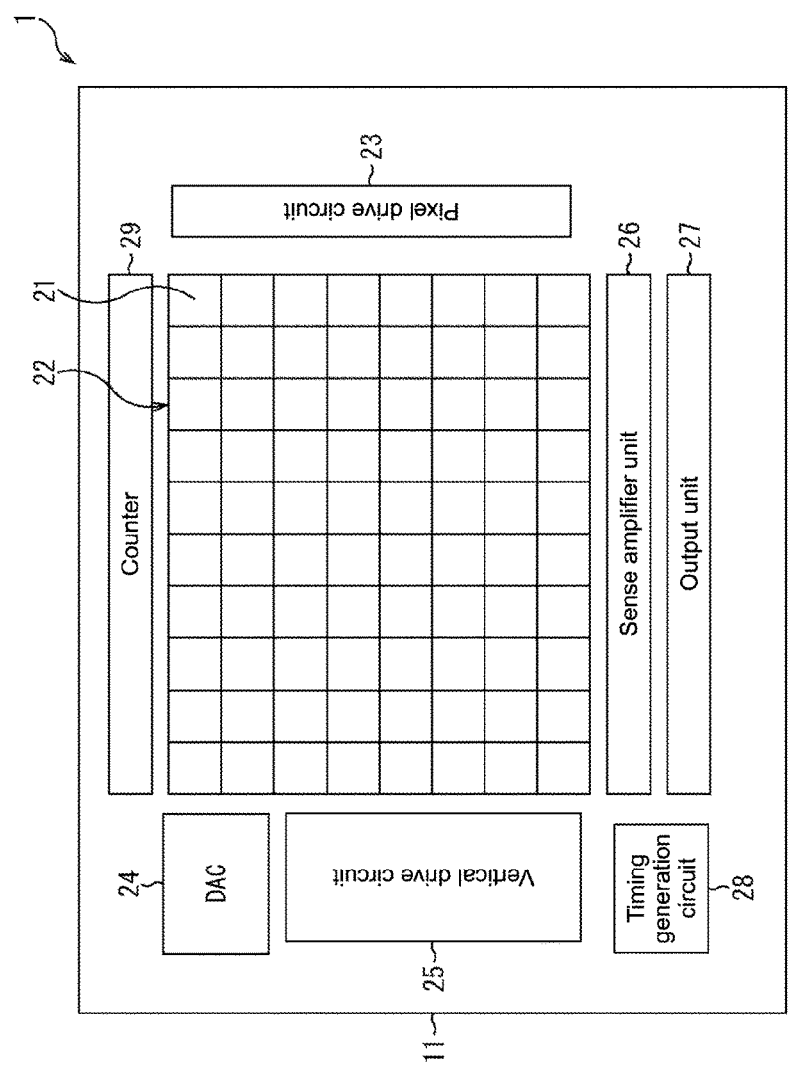
FIG. 1 is a block diagram showing a schematic configuration example of a solid-state imaging device to which the present technology is applied.

A solid-state imaging device 1 of FIG. 1 includes, as a semiconductor, a pixel array unit 22 in which pixels 21 are arranged in a two-dimensional array on a semiconductor substrate 11 using silicon (Si), for example. On the periphery of the pixel array unit 22 on the semiconductor substrate 11, a pixel drive circuit 23, a DAC (D/A Converter) 24, a vertical drive circuit 25, a sense amplifier unit 26, an output unit 27, a timing generation circuit 28, and a counter 29 are formed.

Figure 2:
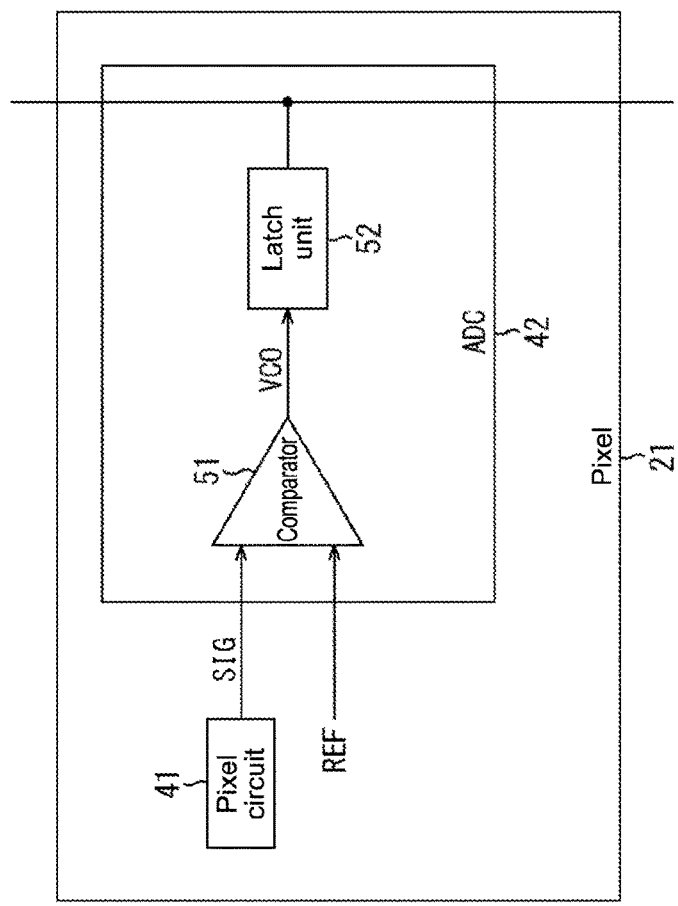
FIG. 2 is a block diagram showing a configuration example of a pixel.

The pixels (hereinafter also referred to as pixel unit) 21 each include a pixel circuit 41 and an ADC 42 therein as shown in FIG. 2. The pixel circuit 41 includes a photoelectric conversion unit that generates and accumulates a charge signal corresponding to the amount of received light, and outputs an analog pixel signal SIG, which is obtained in the photoelectric conversion unit, to the ADC 42. The ADC 42 converts the analog pixel signal SIG, which is supplied from the pixel circuit 41, into a digital signal.

The ADC (AD converter) 42 is constituted of a comparator 51 and a latch unit 52. The comparator 51 compares a reference signal REF supplied from the DAC 24 with the pixel signal SIG, and outputs an output signal VCO as a signal indicating a comparison result. When the reference signal REF and the pixel signal SIG become identical (in terms of current), the comparator 51 inverts the output signal VCO.

As an input signal, a code value BITXn (n=integer from 1 to N) indicating a time of day at that time is input to the latch unit 52. In the latch unit 52, the code value BITXn when the output signal VCO of the comparator 51 is inverted is held and then read as an output signal Coln. With this configuration, a digital value in which the analog pixel signal SIG is digitized into N bits is output from the ADC 42.

The pixel drive circuit 23 of FIG. 1 drives the pixel circuits 41 and the comparators 51 in the pixels 21. The DAC 24 generates the reference signal REF, which is a slope signal having a level (voltage) that monotonically decreases with the elapse of time, and then supplies the reference signal REF to each of the pixels 21. The vertical drive circuit 25 outputs the digital pixel signals SIG generated in the pixels 21 to the sense amplifier unit 26 in a predetermined order on the basis of a timing signal supplied from the timing generation circuit 28. The digital pixel signals SIG output from the pixels 21 are amplified by the sense amplifier unit 26, and then output from the output unit 27 to the outside of the solid-state imaging device 1. The output unit 27 performs predetermined digital signal processing such as black level correction processing for correcting a black level and CDS (Correlated Double Sampling) processing as needed, and then outputs a resultant signal to the outside. The counter 29 perform counting and sends a counter signal to the pixels 21.

The timing generation circuit 28 is constituted of a timing generator that generates various timing signals, and the like, and supplies the generated various timing signals to the pixel drive circuit 23, the DAC 24, the vertical drive circuit 25, and the like.

The solid-state imaging device 1 can be configured as described above. It should be noted that all the circuits that configure the solid-state imaging device 1 are formed on one semiconductor substrate 11 as described above in FIG. 1, but as will be described later, the following configuration can also be provided: the circuits that configure the solid-state imaging device 1 are separately disposed on a plurality of semiconductor substrates 11.

2. First Embodiment of Comparator

Figure 3:
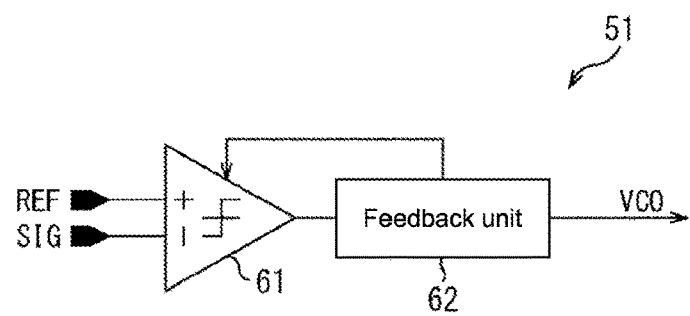
FIG. 3 is a block diagram showing a detailed configuration example of a comparator.

FIG. 3 is a block diagram showing a detailed configuration example of the comparator 51.

The comparator 51 is constituted of a current comparison unit 61 and a feedback unit 62.

The current comparison unit 61 is an inverter circuit. The current comparison unit 61 compares a current having a converted voltage of the pixel signal SIG and a reference current having a converted voltage of the reference signal REF, which is referred to for comparison with the current, between a power supply line and a grounding line, and outputs a comparison result to the feedback unit 62. The comparison result is inverted when the currents become identical.

The feedback unit 62 is a logic circuit that returns (feeds back) a signal, which uses the comparison result by the current comparison unit 61, to a potential line on the pixel signal SIG side, out of the power supply line and the grounding line in the current comparison unit 61. At the start of the comparison by the current comparison unit 61, the feedback unit 62 returns low level as a signal using the comparison result. When the comparison result by the current comparison unit 61 is inverted, the feedback unit 62 returns high level as a signal using the comparison result. With this configuration, the feedback unit 62 can sweep the potential of the reference signal REF. In other words, the feedback unit 62 can cause the current comparison unit 61 to enter a standby state.

3. First Embodiment of Pixel Unit

Figure 4:
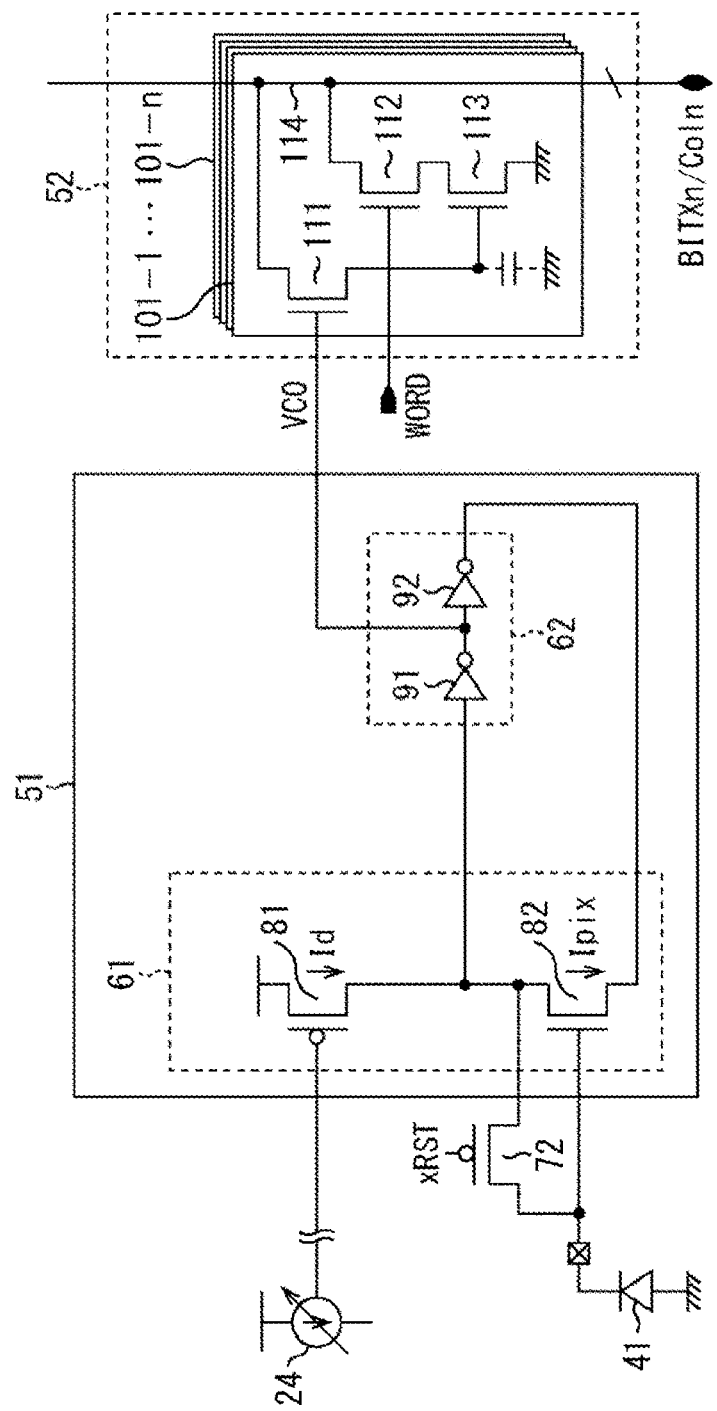
FIG. 4 is a circuit diagram showing a first embodiment of the pixel.

FIG. 4 is a circuit diagram showing a detailed circuit configuration of the pixel unit 21 in a case of the comparator 51 of FIG. 3.

The pixel unit 21 is constituted of the pixel circuit 41, a reset transistor 72, the comparator 51, the latch unit 52.

The current comparison unit 61 of the comparator 51 is constituted of transistors 81 and 82. The transistor 81 is constituted of a PMOS (Positive Channel MOS) transistor. The transistor 82 is constituted of an NMOS (Negative Channel MOS) transistor.

An anode of the pixel circuit 41 is grounded, and a cathode thereof is connected to a source of the reset transistor 72 and a gate of the transistor 82. The DAC 24 outputs a voltage with reference to a power-supply voltage Vdd, as the reference signal REF, to the transistor 81.

The reference signal REF, which is generated and output from the DAC 24, is input to a gate of the transistor 81. The pixel signal SIG, which is output from the pixel circuit 41 within the pixel 21, is input to the gate of the transistor 82. In other words, the transistor 81 converts the voltage with reference to the power-supply voltage Vdd from the DAC 24 and generates a current. The transistor 82 converts the voltage from the pixel circuit 41 within the pixel 21 and generates a current.

A source of the transistor 81 is connected to the power-supply voltage Vdd. A drain of the transistor 81 is connected to a connection point of a drain of the reset transistor 72, a drain of the transistor 82, and the current control unit 61. A connection point of the drain of the transistor 81 and the drain of the transistor 82 becomes an output terminal of the current comparison unit 61 and is connected to the feedback unit 62. Further, the drain of the transistor 82 is connected to an inverter 92 that configures the feedback unit 62.

The feedback unit 62 is constituted of an inverter 91 and the inverter 92. The inverter 91 inputs a comparison result signal of the current comparison unit 61 and outputs an inverted signal, as the output signal VCO, to the latch unit 52. Further, the inverter 91 also outputs the inverted signal to the inverter 92. The inverter 92 inputs the signal from the inverter 91 and outputs (feeds back) the inverted signal to a source of the transistor 82 for the sake of standby control in the current comparison unit 61.

A reset signal xRST is input to a gate of the reset transistor 72. The source of the reset transistor 72 is connected to the pixel circuit 41, and the drain thereof is connected to the connection point of the drain of the transistor 81 and the drain of the transistor 82.

The latch unit 52 is constituted of a dynamic latch, for example. In the latch unit 52, N pieces of latch circuits (data storage unit) 101-1 to 101-N are provided to correspond to N bits that serve as a bit number of AD conversion. It should be noted that in a case where the N pieces of latch circuits 101-1 to 101-N are not particularly distinguished from one another below, the latch circuits 101-1 to 101-N are simply described as latch circuits 101. It should be noted that in terms of a CDS circuit, a circuit including N+1 pieces of latches may be provided in a case where N-bit conversion is finally performed.

Each of the latch circuits 101 is constituted of transistors 111 to 113 and a latch signal output line 114. The output signal VCO of the comparator 51 is input to the gates of the transistors 111 of the N pieces of latch circuits 101-1 to 101-N.

A drain of the transistor 111 to which the output signal VCO is input is connected to the latch signal output line 114.

A drain of the transistor 112 to which a control signal WORD is input is also connected to the same latch signal output line 114. A source of the transistor 111 is connected to a connection point of a floating unit to the ground and a gate of the transistor 113. A drain of the transistor 113 is connected to a source of the transistor 112 and a source thereof is grounded.

A code input signal (code value) BITXn of 0 or 1, which indicates a time of day at that time, is input to the latch signal output line 114 of an n-th bit latch circuit 101-n. The code input signal BITXn is a bit signal such as a Gray code. Data LATn is stored in the latch circuit 101-n. The data LATn is data at the moment when the output signal VCO of the comparator 51, which is input to the gate of the transistor 111, is inverted.

The control signal WORD for read is input to a gate of the transistor 112 of the n-th bit latch circuit 101-n. When a read timing for the n-th bit latch circuit 101-n has come, the control signal WORD becomes Hi, and an n-th bit latch signal (code output signal) Coln is output from the latch signal output line 114.

The latch unit 52 is configured as described above, and thus the ADC 42 can operate as an integrating-type AD converter.

Figure 5:
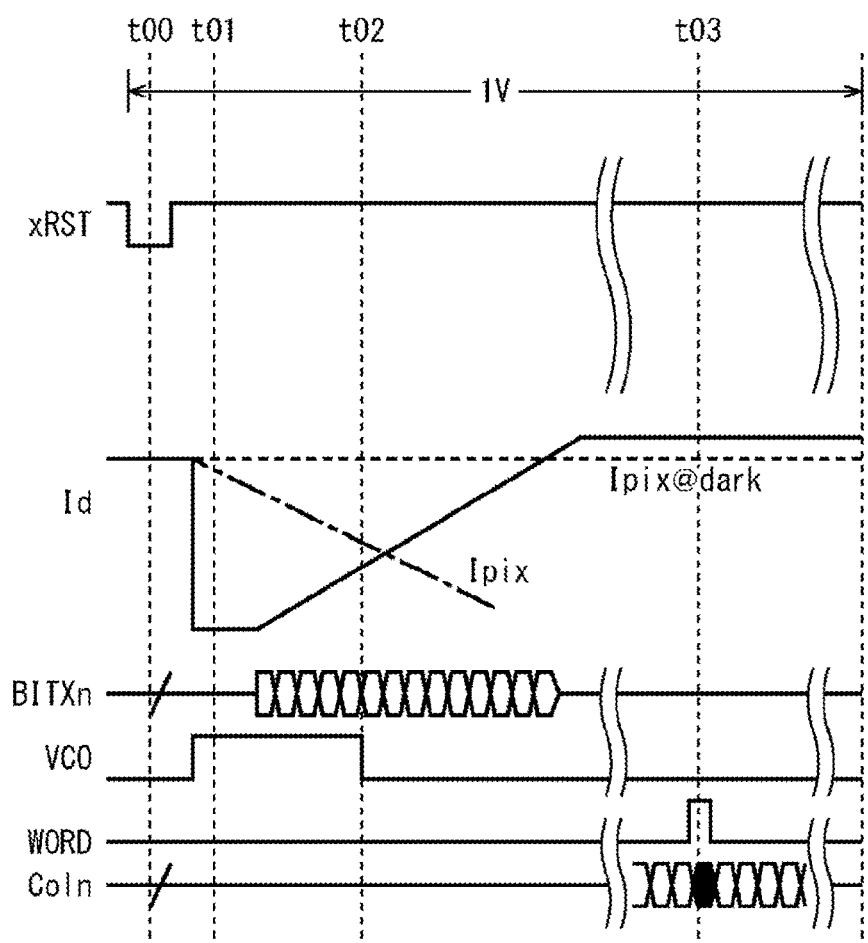
FIG. 5 is a timing chart for describing an operation of the pixel according to the first embodiment.

FIG. 5 is a timing chart showing an operation of the pixel unit 21 of FIG. 4 in one vertical signal interval (1 V).

At timing t00, the reset signal xRST is input, the pixel circuit 41 is reset by the reset transistor 72, and the pixel unit 21 is initialized. At this time, variations in threshold value of the current comparison unit 61 constituted of the transistor 81 (PMOS) and the transistor 82 (NMOS) are stored in the cathode side of the pixel circuit 41 (PD). It should be noted that in the case of the example of FIG. 4, since there is no transfer gate, the variations in threshold value are stored in the PD. However, in the case where there is a transfer gate, the variations in threshold value are stored in an FD (floating diffusion).

Next, at timing t01, a current Id for reference is reduced more than that at the time of pixel resetting. Next, the counter 29 on the outside is operated, and the code input signal (code value) BITXn is supplied to the latch signal output line 114. At the same time, the current Id for reference is increased such that a value of the counter becomes zero when the current Id for reference reaches the original current value. In other words, in the example of FIG. 5, the reference signal REF is a slope signal for which the voltage is controlled such that the reference current for comparison monotonically increases with the elapse of time.

At this time, in a case where a photodiode within the pixel circuit 41 is in the light, a gate voltage thereof is reduced more than that at the time of resetting, and a resultant current Ipix changes so as to gradually decrease as indicated by a chain line of FIG. 5. When the current values of the transistor 81 (PMOS) and the transistor 82 (NMOS) become equal to each other (timing t02), the output signal VCO is inverted (changes to LOW). In a case where the photodiode is not in the light, the current Ipix does not change from the same value as indicated by a dotted line, and is finally inverted.

When the output signal VCO is inverted, in the latch circuit 101-n (n=1 to N) of the latch unit 52, the data LATn at the moment when the output signal VCO is inverted is stored. At the same time, due to the inversion of the output signal VCO, the inverter 92 returns the output signal VCO (H) to the source of the transistor 82 (NMOS).

In other words, the current comparison unit 61 starts comparison in a state where the current Id<the current Ipix. In a case where the current Id<the current Ipix, the feedback unit 62 returns the output signal VCO (L) to the source of the transistor 82 (NMOS). When the comparison result of the current comparison unit 61 is in a state where the current Id the current Ipix, the feedback unit 62 returns the output signal VCO (H) to the source of the transistor 82 (NMOS).

When the output signal VCO (H) is supplied from the inverter 92, as a result, a source part of the transistor 82 (NMOS) is raised from the GND (ground) to the power supply and the current is inhibited from flowing, so that the current comparison unit 61 enters a standby state. This can achieve low power consumption.

It should be noted that those operations are simultaneously performed on all the pixels as a global shutter function. This can suppress reduction in sensitivity as compared with A/D conversion for each line.

After the output signal VCO is written, in a signal read period, the control signal WORD for read is input to the gate of the transistors 112 of the latch circuit 101. When a read timing t03 has come, the control signal WORD becomes Hi, and thus an n-th line latch signal (code output signal) Col is output from the latch signal output line 114.

4. Second Embodiment of Comparator

Figure 6:
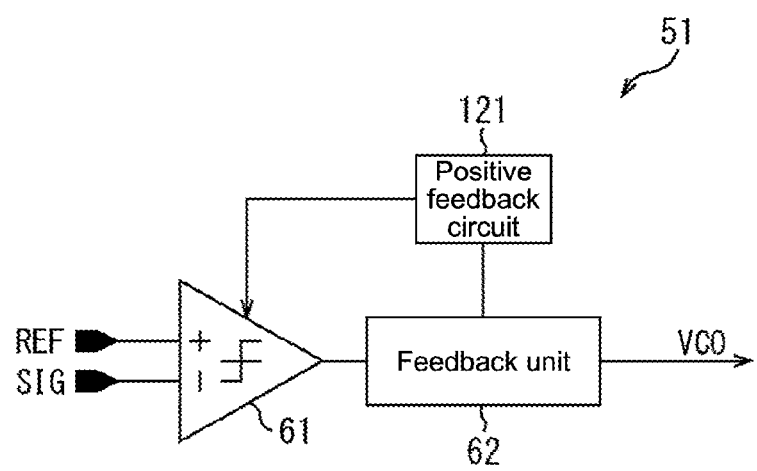
FIG. 6 is a block diagram showing a detailed configuration example of the comparator.

FIG. 6 is a block diagram showing a detailed configuration example of the comparator 51.

The comparator 51 of FIG. 6 is common to the comparator 51 of FIG. 3 in terms of including the current comparison unit 61 and the feedback unit 62. The comparator 51 of FIG. 6 is different from the comparator 51 of FIG. 3 in that a positive feedback circuit (PFB) 121 that is a circuit for speeding up changes in output is added.

5. Second Embodiment of Pixel Unit

Figure 7:
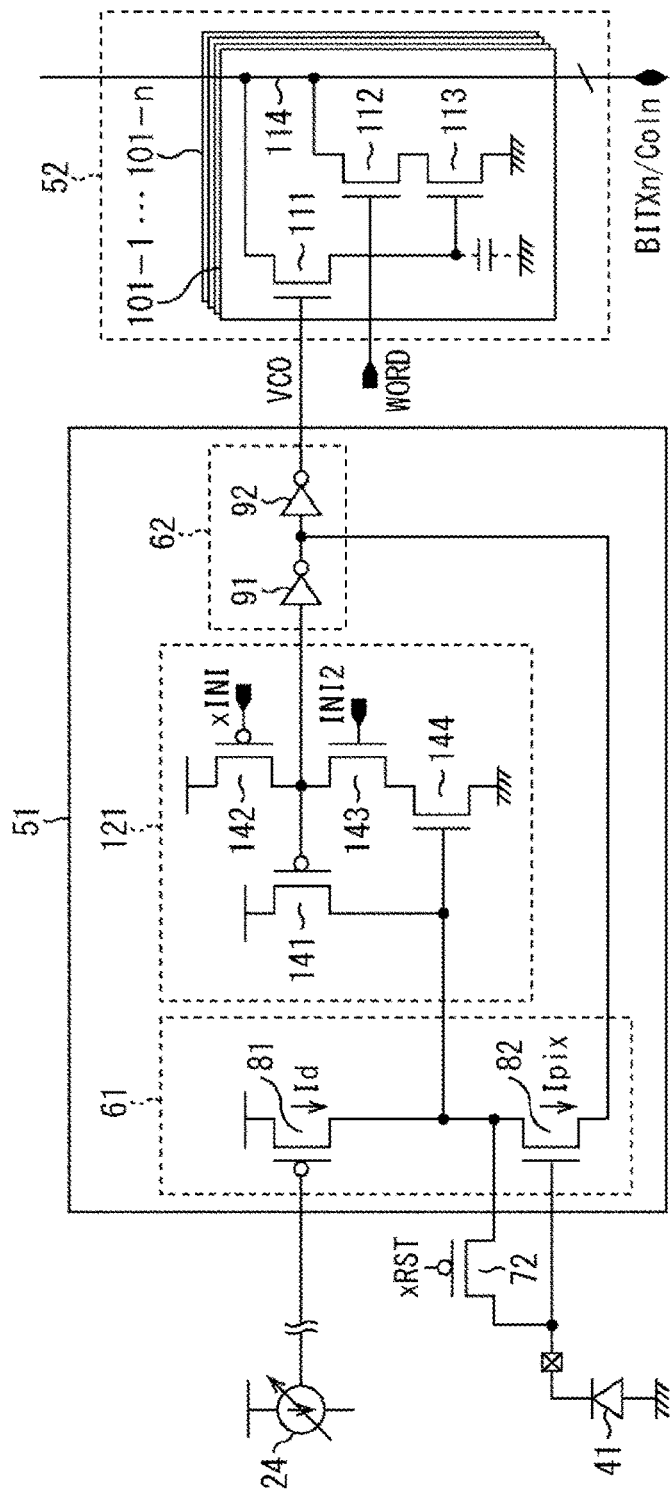
FIG. 7 is a circuit diagram showing a second embodiment of the pixel.

FIG. 7 is a circuit diagram showing a detailed circuit configuration of the pixel unit 21 in the case of the comparator 51 of FIG. 6.

The pixel unit 21 of FIG. 7 is common to the pixel unit 21 of FIG. 4 in terms of including the pixel circuit 41, the reset transistor 72, the comparator 51, and the latch unit 52. The pixel unit 21 of FIG. 7 is different from the pixel unit 21 of FIG. 4 in that the positive feedback circuit 121 is added to the comparison unit 51.

The positive feedback circuit 121 is constituted of four transistors 141 to 144. Here, the transistors 141 and 142 are each constituted of a PMOS transistor, and the transistors 143 and 144 are each constituted of an NMOS transistor.

The connection point of the drain of the transistor 81 and the drain of the transistor 82 is assumed as an output terminal of the current comparison unit 61 and is connected to a drain of the transistor 141 and a gate of the transistor 144 within the positive feedback circuit 121.

Sources of the transistors 141 and 142 are connected to the power-supply voltage Vdd. A gate of the transistor 141 is connected to a drain of the transistor 142, a drain of the transistor 143, and the inverter 91 of the feedback unit 62. An initialization signal xINI is input to a gate of the transistor 142. A source of the transistor 143 is connected to a drain of the transistor 144. An initialization signal INI2 is input to a gate of the transistor 143. A source of the transistor 144 is grounded.

An operation of the pixel unit 21 (particularly the positive feedback circuit 121) configured as described above will be described with reference to a timing chart of FIG. 8. In an example of FIG. 8, a timing chart in one vertical signal interval (1 V) is shown.

At timing t10, the reset signal xRST is input, the pixel circuit 41 is reset by the reset transistor 72, and the pixel unit 21 is initialized. At this time, variations in threshold value of the current comparison unit 61 constituted of the transistor 81 (PMOS) and the transistor 82 (NMOS) are stored in the cathode side of the pixel circuit 41 (PD).

The positive feedback circuit 121 is initialized by the initialization signal xINI and the initialization signal INI2 simultaneously when the pixel circuit 41 is reset. After the reset of the pixel circuit 41 is completed at timing t10, the initialization signal INI2 is cancelled at timing t11. Subsequently, the initialization signal INI is cancelled, and an operation preparation is completed. It should be noted that, at this time, while the PMOS transistor 142 is turned on by the Low initialization signal xINI, the NMOS transistor 143 is turned off by the Low initialization signal INI2. Thus, a current flowing from the transistor 142 to the transistor 144 of the positive feedback circuit 121 can be cut.

As in the case of FIG. 4, at timing t11, the current Id for reference is reduced more than that at the time of pixel resetting. Next, the counter 29 on the outside is operated, and the code input signal (code value) BITXn is supplied to the latch signal output line 114. At the same time, the current Id for reference is increased such that a counter value becomes zero when the current Id for reference reaches the original current value.

Figure 8:
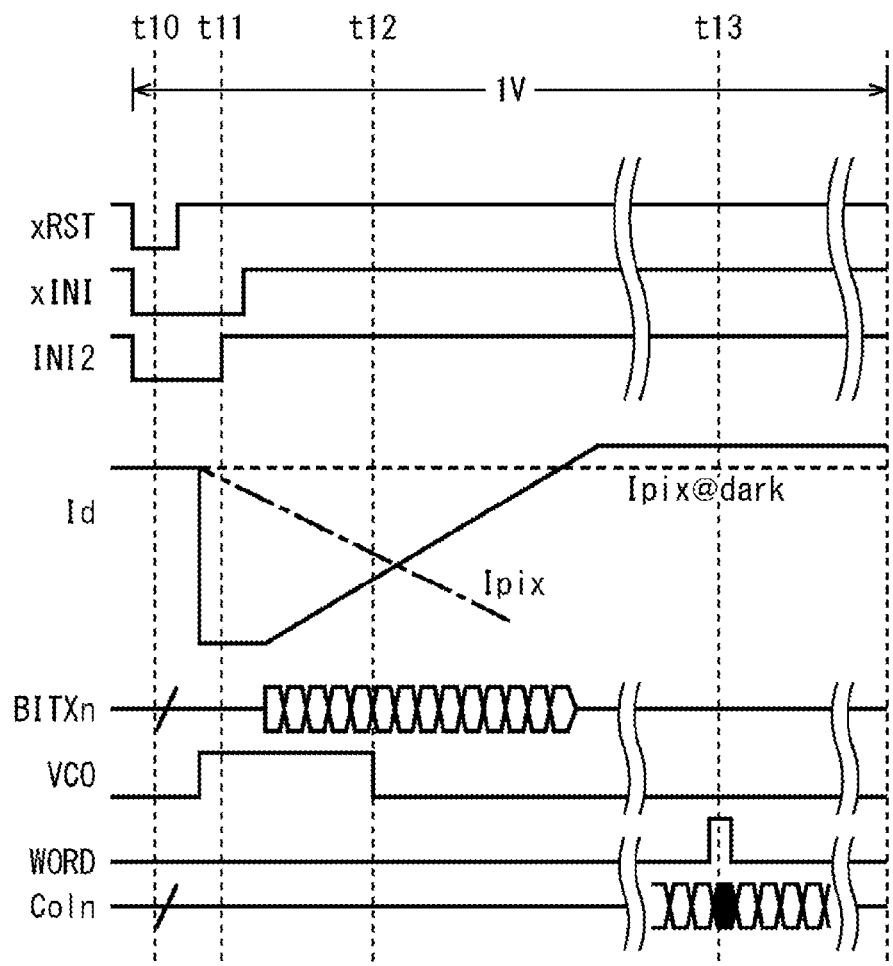
FIG. 8 is a timing chart for describing an operation of the pixel according to the second embodiment.

At this time, in a case where the photodiode within the pixel circuit 41 is in the light, a gate voltage thereof is reduced more than that at the time of resetting, and a resultant current Ipix changes as indicated by a chain line of FIG. 8.

Further, at this time, in the positive feedback circuit 121, the PMOS transistor 141 is in an OFF state due to the initialization signal xINI also after the initialization is cancelled. The input of the NMOS transistor 144 becomes close to the GND (ground) and is in the OFF state, because the current Ipix>the current Id. The photodiode is in the light, the current Ipix=Id, and an output voltage rises from the GND (ground). At that time, the NMOS transistor 144 is turned ON, and an input voltage that is a potential near the power supply of the PMOS transistor 141 is lowered. At the same time, the PMOS transistor 141 for input is turned ON, and the potential of the input gate of the NMOS transistor 144 is further raised to the power supply side. In other words, the potential of the input gate of the NMOS transistor 144 is raised more drastically than the case of the example of FIG. 5.

In such a manner, positive feedback for increasing a change speed when the output signal VCO is inverted is performed. Subsequently, when the current values of the transistor 81 (PMOS) and the transistor 82 (NMOS) become equal to each other (timing t02), the output signal VCO is inverted (changes to LOW). In a case where the photodiode is not in the light, the current Ipix does not change from the same value as indicated by a dotted line, and is finally inverted.

When the output signal VCO is inverted, in the latch circuit 101-$n$ ($n$=1 to N) of the latch unit 52, the data LATn at the moment when the output signal VCO is inverted is stored. At the same time, due to the inversion of the output signal VCO, the inverter 92 returns the output signal VCO (H) to the source of the transistor 82 (NMOS). It should be noted that details of this part are similar to the example of FIG. 5 and thus description thereof will be omitted.

When the output signal VCO (H) is supplied from the inverter 92, as a result, a source part of the transistor 82 (NMOS) is raised from the GND (ground) to the power supply and the current is inhibited from flowing, so that the current comparison unit 61 enters a standby state. This can achieve low power consumption. It should be noted that those operations are simultaneously performed on all the pixels, and as a result, become a global shutter operation.

After the output signal VCO is written hereafter, operations at timing t13 and later, operations thereafter, are similar to the operations at timing t03 and later in the case of the example of FIG. 5, and description thereof will be omitted without repetition.

6. Third Embodiment of Pixel Unit

Figure 9:
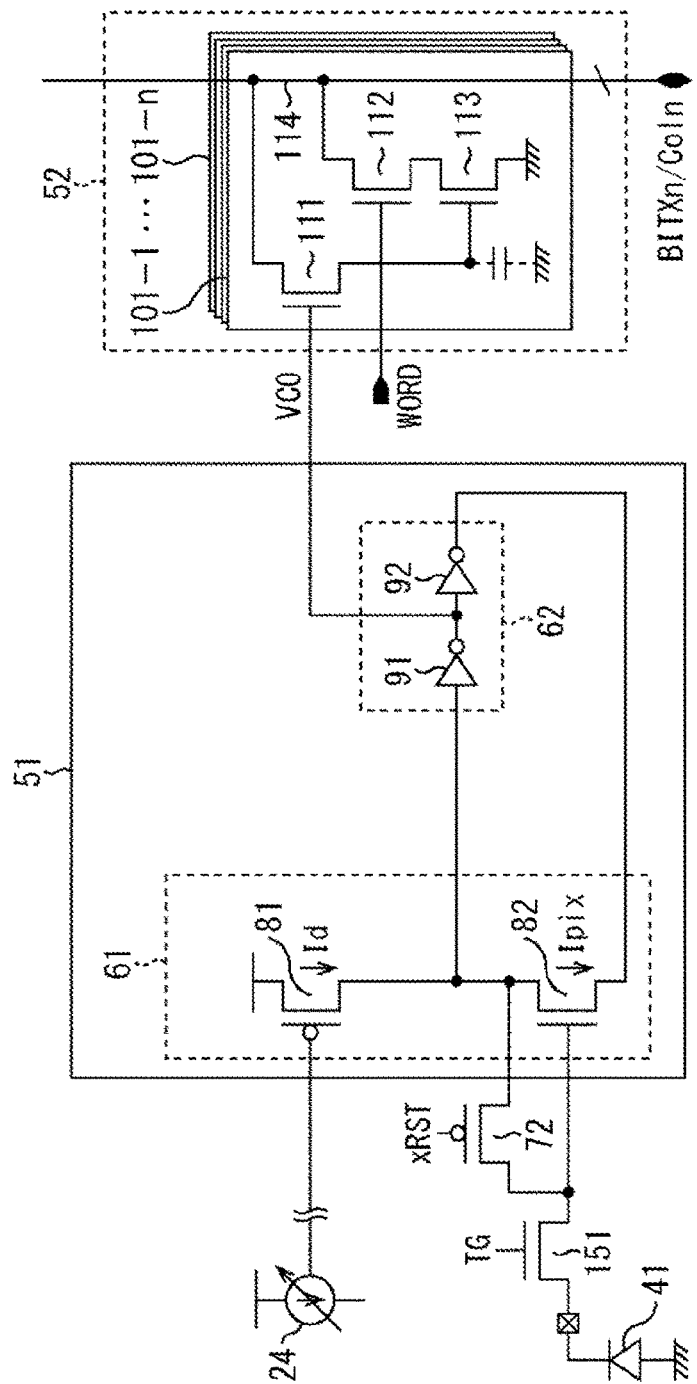
FIG. 9 is a circuit diagram showing a third embodiment of the pixel.

FIG. 9 is a circuit diagram showing a detailed circuit configuration of the pixel unit 21 in the case of the comparator 51 of FIG. 3.

The pixel unit 21 of FIG. 9 is common to the pixel unit 21 of FIG. 4 in terms of including the pixel circuit 41, the reset transistor 72, the comparator 51, and the latch unit 52. The pixel unit 21 of FIG. 7 is different from the pixel unit 21 of FIG. 4 in that a transfer gate 151 is added.

In other words, a source of the transfer gate 151 that transfers a signal by a control signal TG is connected to the cathode side of the pixel circuit 41. The source of the reset transistor 72 and the gate of the transistor 82 are connected to a drain of the transfer gate 151.

Figure 10:
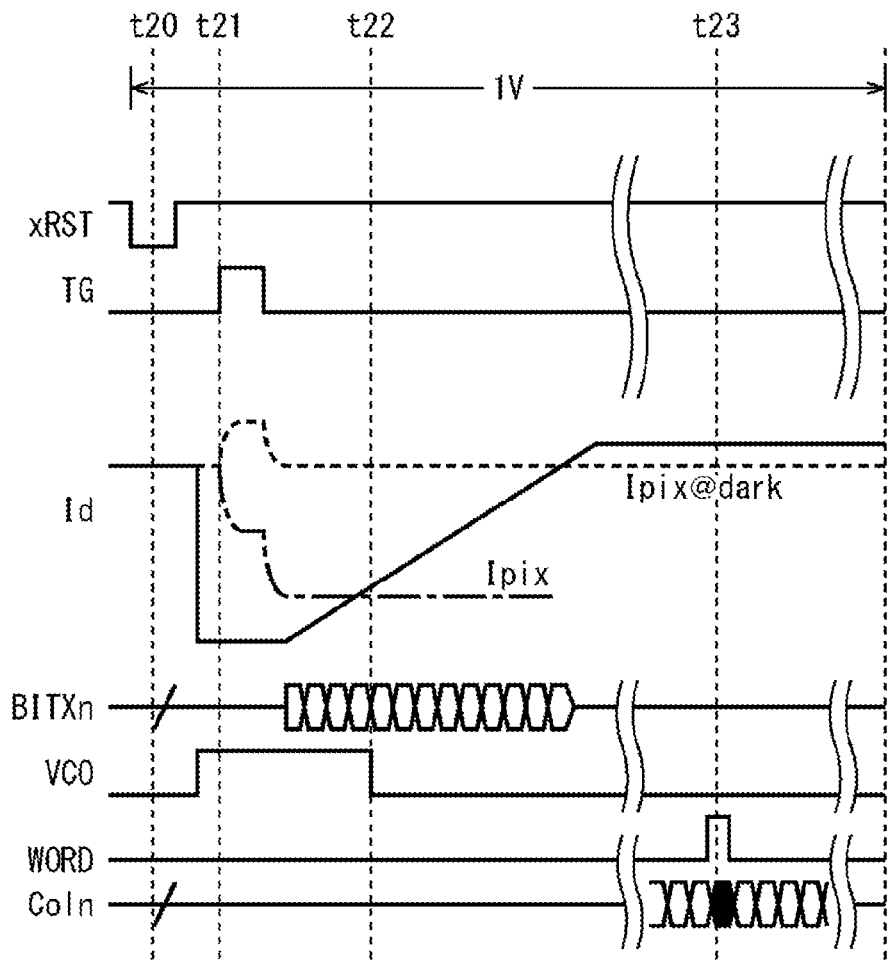
FIG. 10 is a timing chart for describing an operation of the pixel according to the third embodiment.

An operation of the pixel unit 21 (particularly the transfer gate 151) configured as described above will be described with reference to a timing chart of FIG. 10. In an example of FIG. 10, a timing chart in one vertical signal interval (1 V) is shown.

At timing t20, the reset signal xRST is input, the pixel circuit 41 is reset by the reset transistor 72, and the pixel unit 21 is initialized. At this time, variations in threshold value of the current comparison unit 61 constituted of the transistor 81 (PMOS) and the transistor 82 (NMOS) are stored in an FD that is formed at a connection point of the drain of the transfer gate 151, the source of the reset transistor 72, and the gate of the transistor 82.

Next, at timing t21, the current Id for reference is reduced more than that at the time of pixel resetting. Next, the counter 29 on the outside is operated, and the code input signal (code value) BITXn is supplied to the latch signal output line 114. The control signal TG is input to the transfer gate 151, and the transfer gate 151 is turned on. After the transfer, the current Id for reference is increased. In a case where the photodiode within the pixel circuit 41 is in the light during the transfer, a gate voltage thereof is reduced more than that at the time of resetting and, after the transfer, further reduced and then fixed. A resultant current Ipix changes as indicated by a chain line of FIG. 10. Subsequently, when the current values of the transistor 81 (PMOS) and the transistor 82 (NMOS) become equal to each other (timing t02), the output signal VCO is inverted (changes to LOW). In a case where the photodiode is not in the light, the current Ipix rises as indicated by a dotted line during the transfer, but the current Ipix does not change from the same value after the transfer and is finally inverted.

When the output signal VCO is inverted, in the latch circuit 101-$n$ ($n$=1 to N) of the latch unit 52, the data LATn at the moment when the output signal VCO is inverted is stored. At the same time, due to the inversion of the output signal VCO, the inverter 92 returns the output signal VCO (H) to the source of the transistor 82 (NMOS).

Since the output signal VCO is supplied from the inverter 92, a source part of the transistor 82 (NMOS) is raised from the GND (ground) to the power supply and the current is inhibited from flowing, so that the current comparison unit 61 enters a standby state. This can achieve low power consumption. It should be noted that those operations are simultaneously performed on all the pixels, and as a result, become a global shutter operation.

After the output signal VCO is written hereafter, operations at timing t23 and later, operations thereafter, are similar to the operations at timing t03 and later in the case of the example of FIG. 5, and description thereof will be omitted without repetition.

In a case where the transfer gate is provided as described above, since the control signal TG is added, the current Ipix does not change with time and is fixed after the transfer.

7. Fourth Embodiment of Pixel Unit

Figure 11:
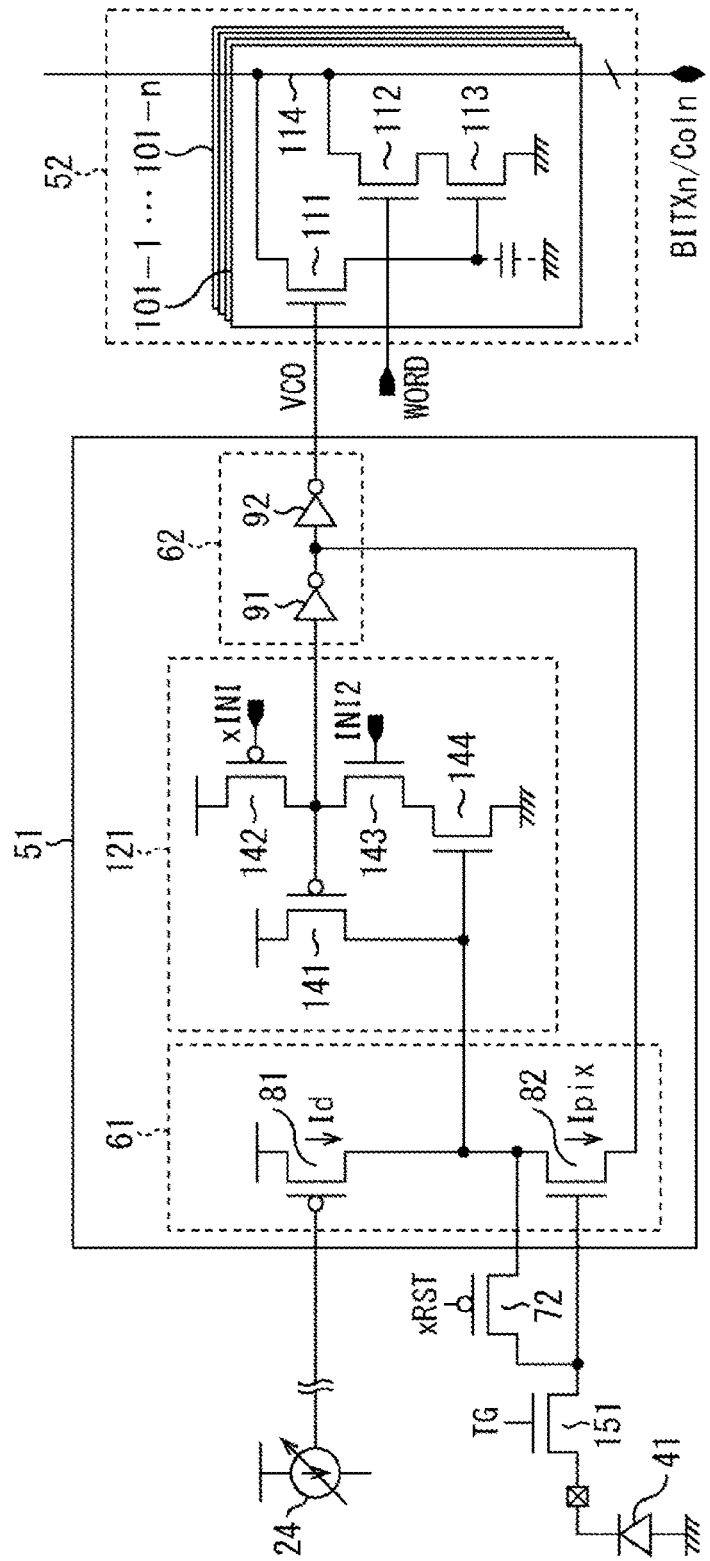
FIG. 11 is a circuit diagram showing a fourth embodiment of the pixel.

FIG. 11 is a circuit diagram showing a detailed circuit configuration of the pixel unit 21 in the case of the comparator 51 of FIG. 6.

The pixel unit 21 of FIG. 11 is common to the pixel unit 21 of FIG. 7 in terms of including the pixel circuit 41, the reset transistor 72, the comparator 51, the latch unit 52, and the positive feedback circuit 121. The pixel unit 21 of FIG. 11 is different from the pixel unit 21 of FIG. 7 in that the transfer gate 151 described with reference to FIG. 9 is added.

In other words, the source of the transfer gate 151 that transfers a signal by the control signal TG is connected to the cathode side of the pixel circuit 41. The source of the reset transistor 72 and the gate of the transistor 82 are connected to the drain of the transfer gate 151.

Figure 12:
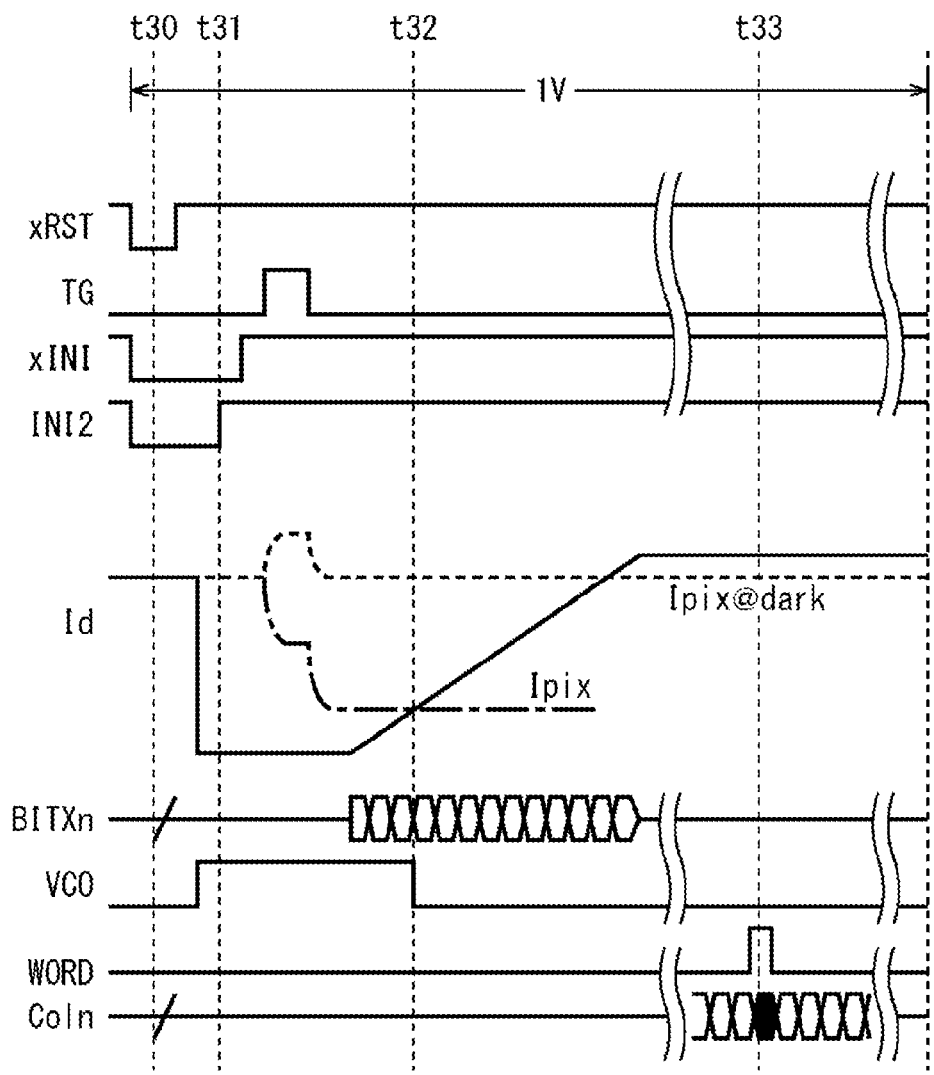
FIG. 12 is a timing chart for describing an operation of the pixel according to the fourth embodiment.

An operation of the pixel unit 21 (particularly the positive feedback circuit 121 and the transfer gate 151) configured as described above will be described with reference to a timing chart of FIG. 12. In an example of FIG. 12, a timing chart in one vertical signal interval (1 V) is shown.

At timing t30, the reset signal xRST is input, the pixel circuit 41 is reset by the reset transistor 72, and the pixel unit 21 is initialized. At this time, variations in threshold value of the current comparison unit 61 constituted of the transistor 81 (PMOS) and the transistor 82 (NMOS) are stored in the FD that is formed at the connection point of the drain of the transfer gate 151, the source of the reset transistor 72, and the gate of the transistor 82.

The positive feedback circuit 121 is initialized by the initialization signal xINI and the initialization signal INI2 simultaneously when the pixel circuit 41 is reset. After the reset of the pixel circuit 41 is completed at timing t30, the initialization signal INI2 is cancelled at timing t31. Subsequently, the initialization signal INI is cancelled, and an operation preparation is completed.

Further, at timing t31, the current Id for reference is reduced more than that at the time of pixel resetting. Next, after the initialization signal xINI is cancelled, the control signal TG is input to the transfer gate 151, and the transfer gate 151 is turned on. After the transfer, the current Id for reference is increased. At the same time, the counter 29 on the outside is operated, and the code input signal (code value) BITXn is supplied to the latch signal output line 114. Here, in a case where the photodiode within the pixel circuit 41 is in the light during the transfer, a gate voltage thereof is reduced more than that at the time of resetting and, after the transfer, further reduced and then fixed. A resultant current Ipix changes as indicated by a chain line of FIG. 10. Subsequently, when the current values of the transistor 81 (PMOS) and the transistor 82 (NMOS) become equal to each other (timing t02), the output signal VCO is inverted (changes to LOW). In a case where the photodiode is not in the light, the current Ipix rises as indicated by a dotted line during the transfer, but the current Ipix does not change from the same value after the transfer and is finally inverted.

When the output signal VCO is inverted, in the latch circuit 101-$n$ (n=1 to N) of the latch unit 52, the data LATn at the moment when the output signal VCO is inverted is stored. At the same time, due to the inversion of the output signal VCO, the inverter 92 returns the output signal VCO (H) to the source of the transistor 82 (NMOS). It should be noted that details of this part are similar to the example of FIG. 5 and thus description thereof will be omitted.

When the output signal VCO is supplied from the inverter 92, a source part of the transistor 82 (NMOS) is raised from the GND (ground) to the power supply and the current is inhibited from flowing, so that the current comparison unit 61 enters a standby state. This can achieve low power consumption. It should be noted that those operations are simultaneously performed on all the pixels as a global shutter function.

After the output signal VCO is written hereafter, operations at timing t33 and later, operations thereafter, are similar to the operations at timing t03 and later in the case of the example of FIG. 5, and description thereof will be omitted without repetition.

In a case where the transfer gate is provided as described above, since the control signal TG is added, the current Ipix does not change with time and is fixed after the transfer.

It should be noted that the example in which the latch unit 52 is constituted of a dynamic latch constituted of a DRAM of the three transistors has been described above, but as will be described below, the latch unit 52 may be constituted of a static latch.

8. Second Embodiment of Latch Unit

Figure 13:
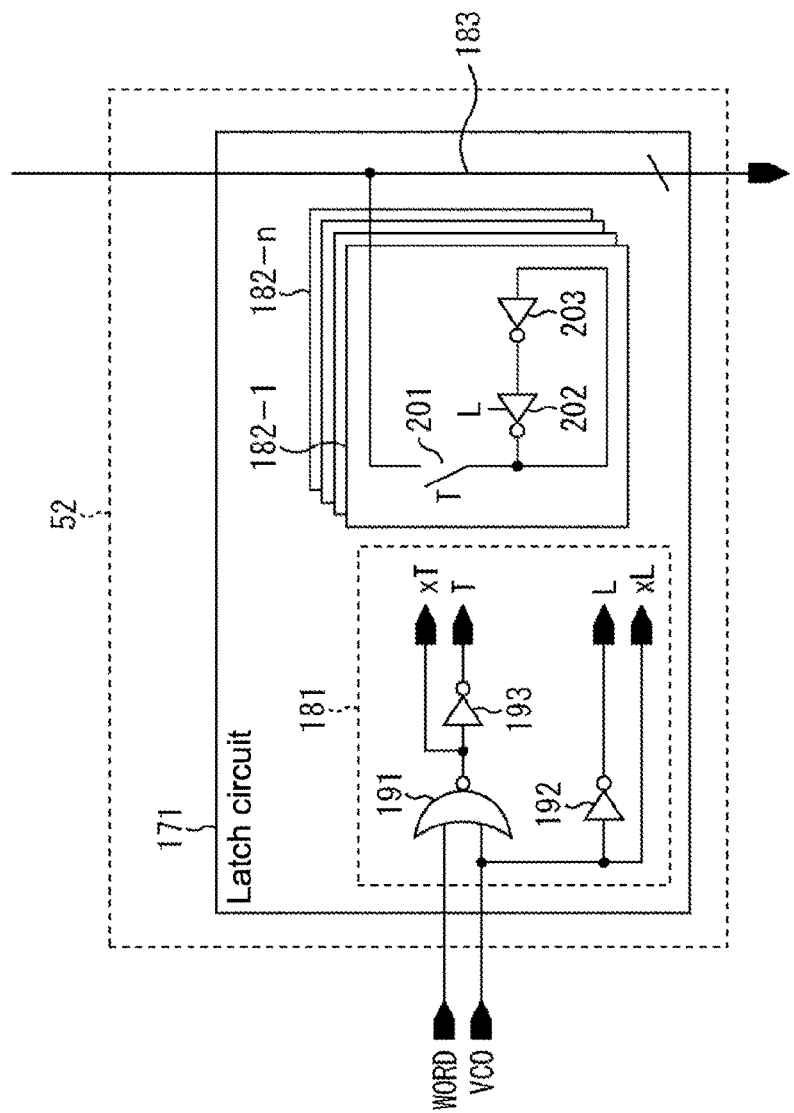
FIG. 13 is a circuit diagram showing a circuit configuration of a latch unit.

FIG. 13 is a circuit diagram of a detailed circuit configuration of the latch unit 52 of FIG. 2.

The latch unit 52 is provided with a latch circuit 171 including static latches 182-1 to 182-$n$ so as to correspond to n bits that serve as a bit number of AD conversion.

The latch circuit 171 is constituted so as to include a multiplexer 181, the static latches 182-1 to 182-$n$, and a latch signal output line 183. It should be noted that in a case where the n pieces of static latches 182-1 to 182-$n$ are not particularly distinguished from one another below, the static latches 182-1 to 182-$n$ are simply described as a static latch 182.

The output signal VCO and the control signal WORD are input to the multiplexer 181, and a computation result is input to each static latch 182. The multiplexer 181 controls read and write of the static latch 182 and is configured so as to include a NOR circuit 191, an inverter 192, and an inverter 193. The output signal VCO is input to the NOR circuit 191, NOT of OR with the control signal WORD is used and output as xT, and a value inverted by the inverter 192 is output as T. Further, the output signal VCO is output as xL, and a value inverted by the inverter 193 is output as L.

When T=ON and L=OFF as a signal from the multiplexer 181, in the static latch 182, the signal is written (taken in) from the latch signal output line 183. When T=OFF and L=ON as a signal from the multiplexer 181, in the static latch 182, the signal is flipped and data written from the latch signal output line 183 is stored. When T=ON and L=ON as a signal from the multiplexer 181, in the static latch 182, the stored data is read from the latch signal output line 183. When T=ON and L=OFF as a signal from the multiplexer 181, in the static latch 182, impedance becomes High and this does not affect the latch signal output line 183.

As described above, in the case where the latch unit 52 is constituted of the static latches, read and write control is performed within the latch unit 52, and thus there is no need for a sense amplifier or a counter on the outside.

9. Fifth Embodiment of Pixel Unit

Figure 14:
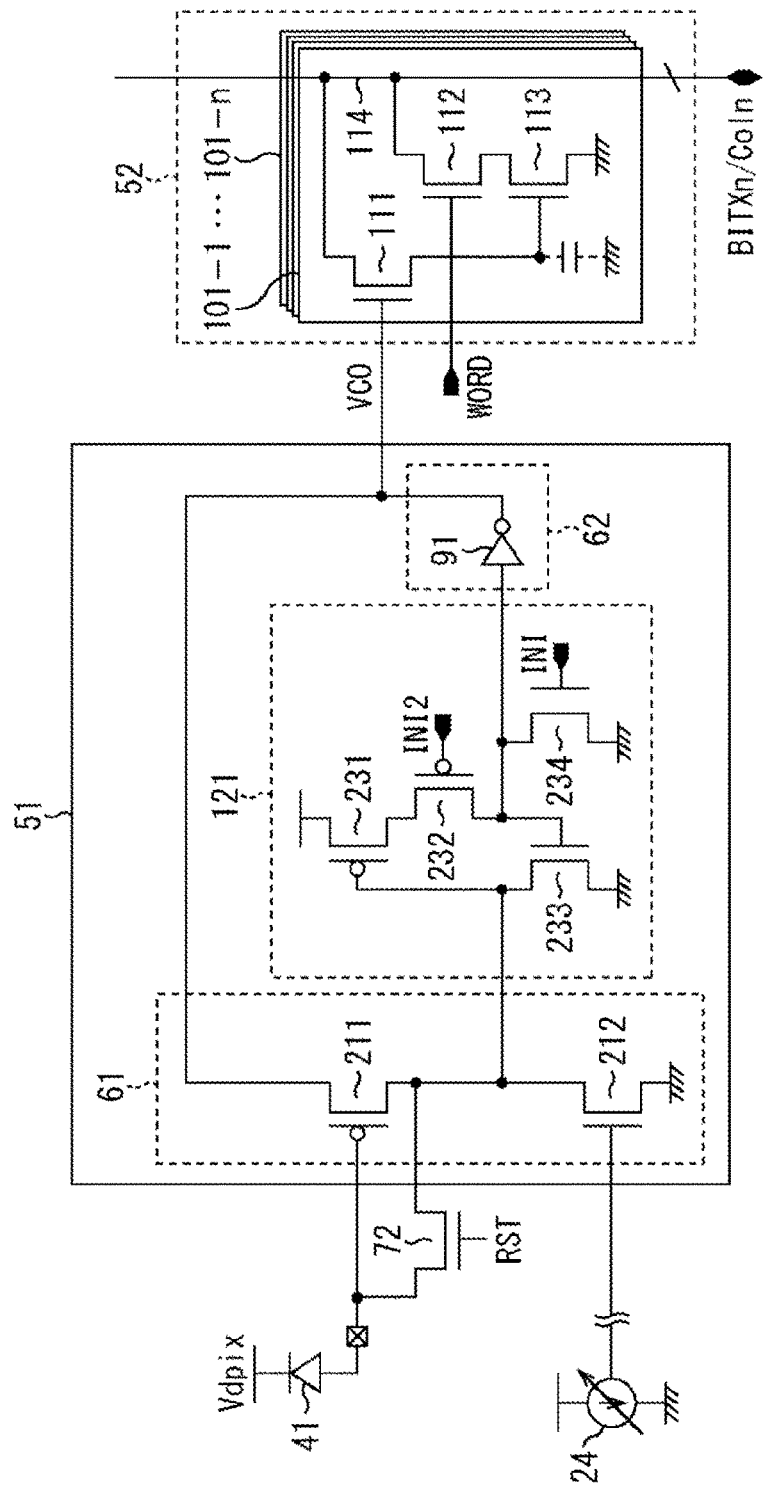
FIG. 14 is a circuit diagram showing a fifth embodiment of the pixel.

FIG. 14 is a circuit diagram of a detailed circuit configuration of the pixel unit 21 in the case of the comparator 51 of FIG. 6.

The pixel unit 21 of FIG. 14 is common to the pixel unit 21 of FIG. 7 in terms of including the pixel circuit 41, the reset transistor 72, the comparator 51, and the latch unit 52. In the pixel unit 21 of FIG. 14, the transistors therein have reverse polarity in contrast to the pixel unit 21 of FIG. 7. It should be noted that the direction of the current and the configuration of the latch unit 52 are respectively the same as the direction and the configuration of the example of FIG. 7, and thus description thereof will be omitted without repetition.

Due to the reverse polarity of the transistors, connection between the respective units, and a configuration of the current comparison unit 61, the positive feedback circuit 121, and the feedback unit 62 of the comparator 51 are different from the configuration of FIG. 7.

The current comparison unit 61 of the comparator 51 is constituted of transistors 211 and 212. The transistor 211 is constituted of a PMOS transistor. The transistor 212 is constituted of an NMOS transistor.

The cathode of the pixel circuit 41 is connected to a voltage Vdpix, and the anode thereof is connected to the source of the reset transistor 72 and a gate of the transistor 211. The DAC 24 outputs the power supply from the ground, as the reference signal REF, to the transistor 212. It should be noted that although the voltage Vdpix is structurally separated from the power supply voltage, the voltage Vdpix may be the same as the power supply voltage.

The pixel signal SIG, which is output from the pixel circuit 41 within the pixel 21, is input to the gate of the transistor 211. The reference signal REF, which is generated and output from the DAC 24, is input to a gate of the transistor 212.

A source of the transistor 211 is connected to a connection point of the inverter 91 of the feedback unit 62 and gates of the transistors 111 of the latch circuits 101. A drain of the transistor 211 is connected to a connection point of the drain of the reset transistor 72, the source of the transistor 82, and the current control unit 61. A connection point of the drain of the transistor 211 and the drain of the transistor 212 becomes an output terminal of the current comparison unit 61 and is connected to the feedback unit 62 through the positive feedback circuit 121. Further, a source of the transistor 212 is grounded.

The positive feedback circuit 121 is constituted of four transistors 231 to 234. Here, the transistors 231 and 232 are each constituted of a PMOS transistor, and the transistors 233 and 234 are each constituted of an NMOS transistor.

The connection point of the drain of the transistor 211 and the source of the transistor 212 is assumed as an output terminal of the current comparison unit 61 and is connected to a gate of the transistor 231 and a drain of the transistor 233 within the positive feedback circuit 121.

A source of the transistor 231 is connected to the power-supply voltage Vdd. A drain of the transistor 231 is connected to a source of the transistor 232. An initialization signal xINI2 is input to a gate of the transistor 232. A connection point of a drain of the transistor 232 and a gate of the transistor 233 becomes an output terminal of the positive feedback circuit 121 and is connected to the feedback unit 62. Sources of the transistor 233 and the transistor 234 are grounded. An initialization signal INI is input to a gate of the transistor 234. A drain of the transistor 234 is connected between the output terminal of the positive feedback circuit 121 and the inverter 91 of the feedback unit 62.

The feedback unit 62 is constituted of the inverter 91, and the inverter 92 is excluded from the example of FIG. 7. The inverter 91 inverts the signal input from the positive feedback circuit 121, and outputs the inverted signal to the latch unit 52 as the output signal VCO. Further, the inverter 91 outputs (feeds back) the inverted signal to the source of the transistor 211 for the sake of standby control in the current comparison unit 61.

Figure 15:
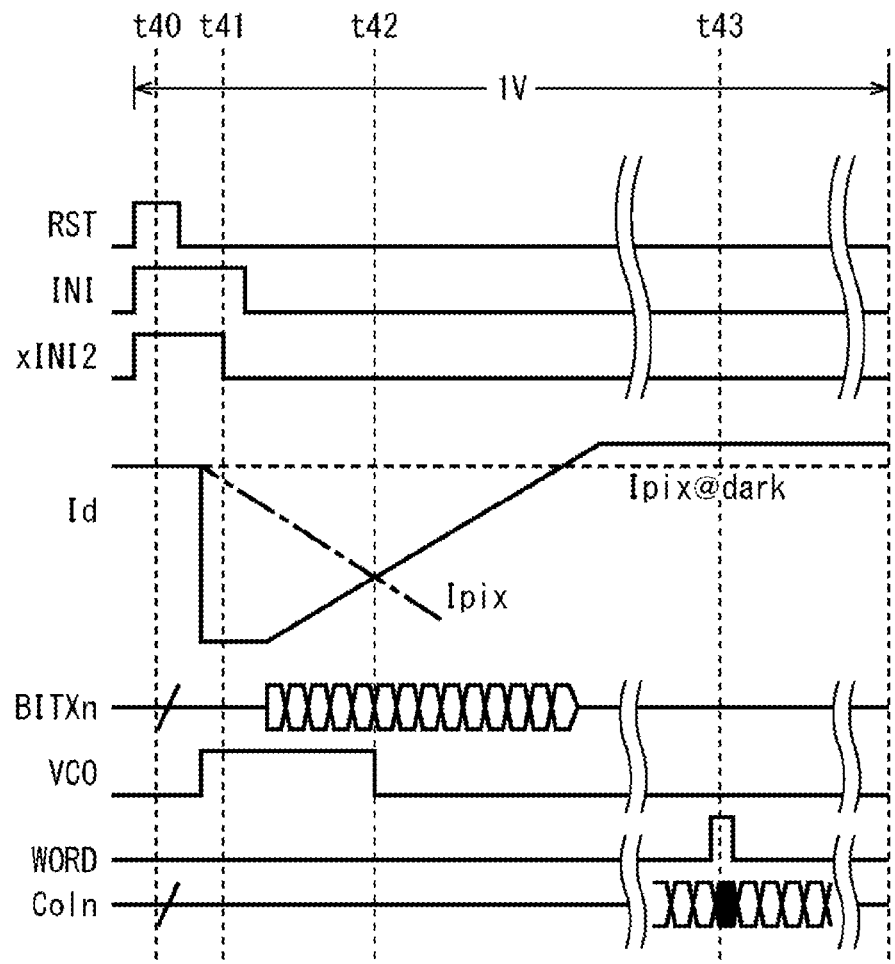
FIG. 15 is a timing chart for describing an operation of the pixel according to the fifth embodiment.
Figure 17:
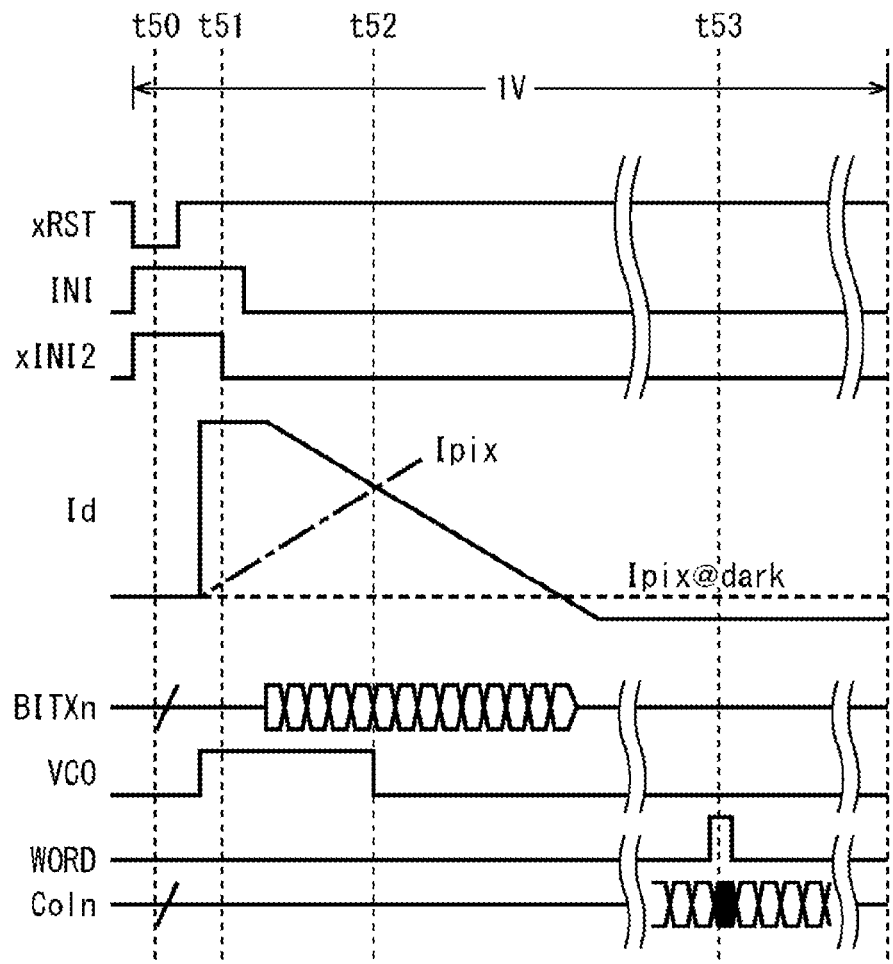
FIG. 17 is a timing chart for describing an operation of the pixel according to the sixth embodiment.

An operation of the pixel unit 21 configured as described above is shown in a timing chart of FIG. 15. It should be noted that an example of FIG. 15 is different from the example of FIG. 7 only in that the reset signal xRST is replaced with a reset signal RST and thus High and Low are inverted, the initialization signal xINI is replaced with the initialization signal INI and thus High and Low are inverted, and the initialization signal INI2 is replaced with the initialization signal xINI2 and thus High and Low are inverted. Therefore, the operation of the example of FIG. 17 is the same as the basic operation of the example of FIG. 7 and thus description thereof will be omitted.

10. Sixth Embodiment of Pixel Unit

Figure 16:
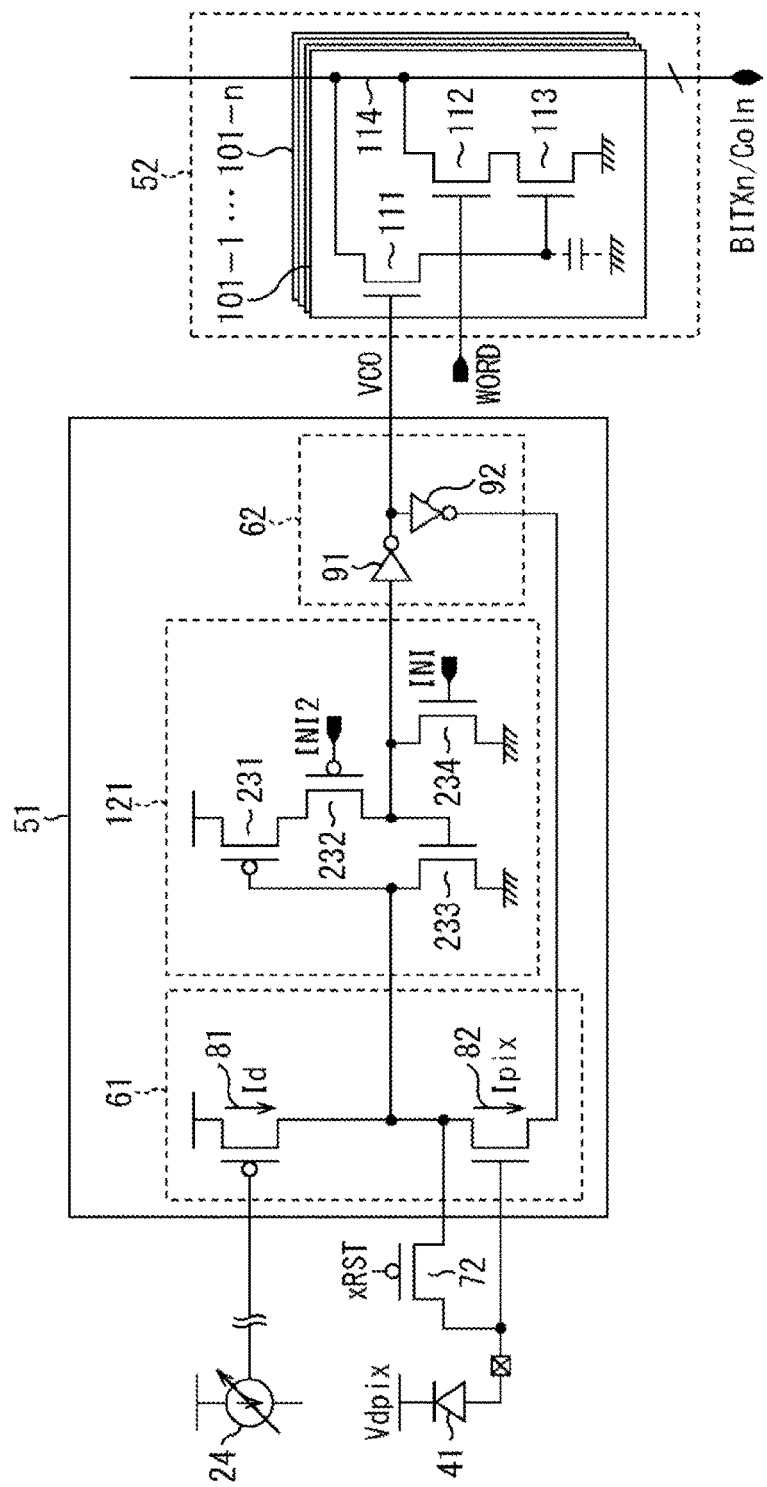
FIG. 16 is a circuit diagram showing a sixth embodiment of the pixel.

FIG. 16 is a circuit diagram showing a detailed circuit configuration of the pixel unit 21 of the case of the comparator 51 of FIG. 6.

The pixel unit 21 of FIG. 16 is common to the pixel unit 21 of FIG. 7 in terms of including the pixel circuit 41, the reset transistor 72, the comparator 51, and the latch unit 52. In the pixel unit 21 of FIG. 16, in contrast to the pixel unit 21 of FIG. 7, the pixel circuit 41 is of a hole accumulation type, e.g., an organic photoelectric conversion layer, the positive feedback circuit 121 of the comparison unit 51 has the reverse polarity, and the current oppositely flows. It should be noted that the configuration of the current comparison unit 61, the feedback unit 62, and the latch unit 52 is the same as that of the example of FIG. 7, and thus description thereof will be omitted without repetition.

Since the pixel circuit 41 is of the hole accumulation type, the configuration of the positive feedback circuit 121 is different from the configuration of FIG. 7.

The cathode of the pixel circuit 41 is connected to the voltage Vdpix similarly to the example of FIG. 14. The anode thereof is connected to the source of the reset transistor 72 and the gate of the transistor 82.

The positive feedback circuit 121 is constituted of the four transistors 231 to 234 in a basically similar manner to the positive feedback circuit 121 of FIG. 14. It should be noted that detailed description will be omitted without repetition.

An operation of the pixel unit 21 configured as described above is shown in a timing chart of FIG. 17. It should be noted that an example of FIG. 17 is different from the example of FIG. 7 only in that the initialization signal xINI is replaced with the initialization signal INI and thus High and Low are inverted, the initialization signal INI2 is replaced with the initialization signal xINI2 and thus High and Low are inverted, and the direction of the current is opposite. Therefore, the operation of the example of FIG. 17 is basically the same as the operation of the example of FIG. 7, and thus description thereof will be omitted.

It should be noted that since the pixel circuit 41 is of the hole accumulation type, the configuration of the positive feedback circuit 121 desirably has the reverse polarity, but may not have the reverse polarity.

Further, since the direction of the current is opposite, the following drive is performed: first, a current Ipix for comparison is caused to flow with a small amount and then with a large amount before AD conversion is performed, and is thereafter reduced so as to be small. In other words, in the example of FIG. 17, the reference signal REF is a slope signal for which the voltage is increased such that the current Id for comparison monotonically decreases with the elapse of time. Therefore, in the case of the example of FIG. 17, the current comparison unit 61 starts comparison in a state where the current Id>the current Ipix. In a case where the current Id>the current Ipix, the feedback unit 62 returns the output signal VCO (L) to the source of the transistor 82 (NMOS). When a comparison result of the current comparison unit 61 is in a state where the current Id<the current Ipix, the feedback unit 62 returns the output signal VCO (H) to the source of the transistor 82 (NMOS).

Figure 18:
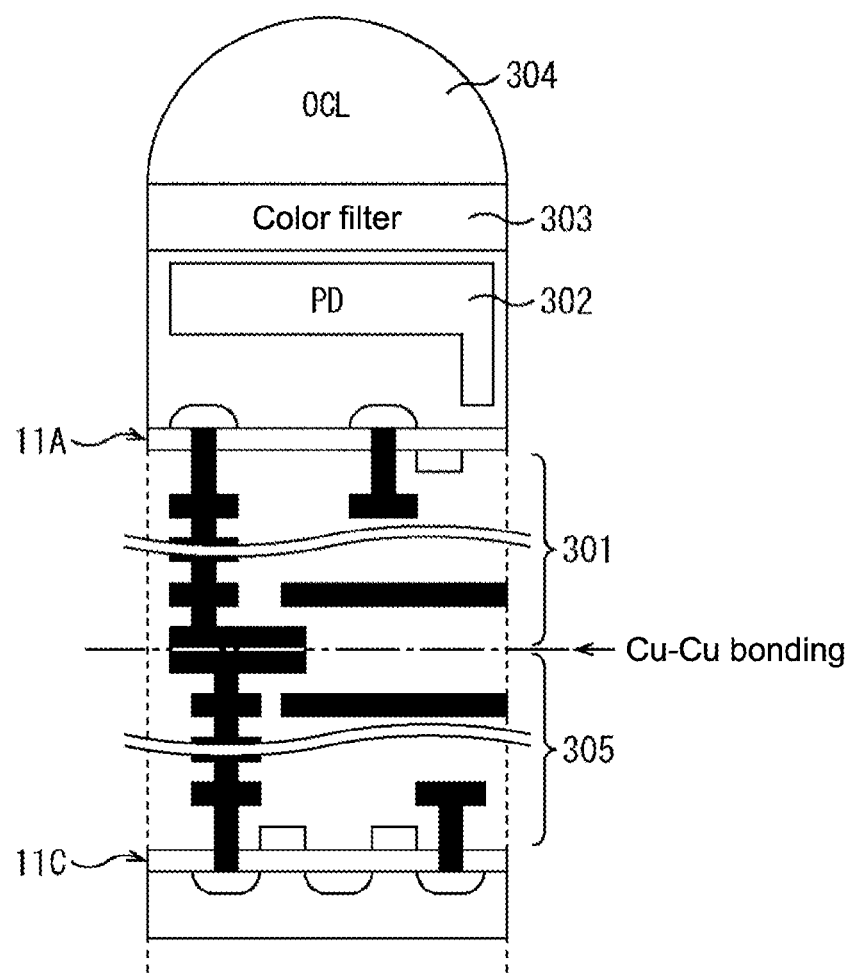
FIG. 18 is a diagram for describing an example constituted of two semiconductor substrates.

It should be noted that if a configuration shown in FIG. 18 is provided, the feedback unit 62 of the pixel unit 21 of FIG. 16 can be constituted of a single inverter and can reduce one inverter.

As described above, in the present technology, a comparison unit and a storage unit are configured on a pixel-to-pixel basis. The comparison unit receives light incident on a pixel, performs photoelectric conversion to generate a voltage, compares a current generated from the voltage with reference to a first potential line and a reference current generated with reference to a second potential line and having a converted voltage of a reference signal referred to for comparison with the current, the first potential line being one of a power supply line and a grounding line, the second potential line being another one of the power supply line and the grounding line, and returns a signal to a source side when the current is generated, the signal using a comparison result inverted when the current and the reference current become identical. The storage unit stores, as a digital value, a signal when the comparison result by the comparison unit is inverted.

As configured as described above, according to the present technology, an A/D conversion signal of the global shutter operation can be obtained, and thus reduction in sensitivity can be suppressed as compared to the write for each line.

Further, since the standby state is obtained after the signal is inverted, a steady current is not caused to flow after the signal is inverted, and thus low power consumption can be achieved.

11. First Embodiment of Multi-substrate Configuration

In the above description, the solid-state imaging device 1 has been described as one formed on the single semiconductor substrate 11, but the solid-state imaging device 1 may be configured by separately producing the circuits on a plurality of semiconductor substrates 11.

FIG. 18 is a schematic cross-sectional diagram of a case where the solid-state imaging device 1 is constituted of the two semiconductor substrates 11.

An upper substrate 11A is of a back-side illumination type in which a photodiode 302, a color filter 303, an OCL (On-Chip Lens) 304, and the like are formed on the back surface side opposite to the front surface side on which a wiring layer 301 is formed.

The wiring layer 301 of the upper substrate 11A is attached to the wiring layer 305 on the front surface side of a lower layer substrate 11C, by a bonding technology such as Cu—Cu bonding.

For example, the pixel circuit 41 including the photodiode 302 is at least formed on the upper substrate 11A. The latch unit 52 including one or more latch circuits 101 is at least formed on the lower substrate 11C. The upper substrate 11A and the lower substrate 11C are bonded by, for example, metal-binding such as Cu—Cu.

Figure 19:
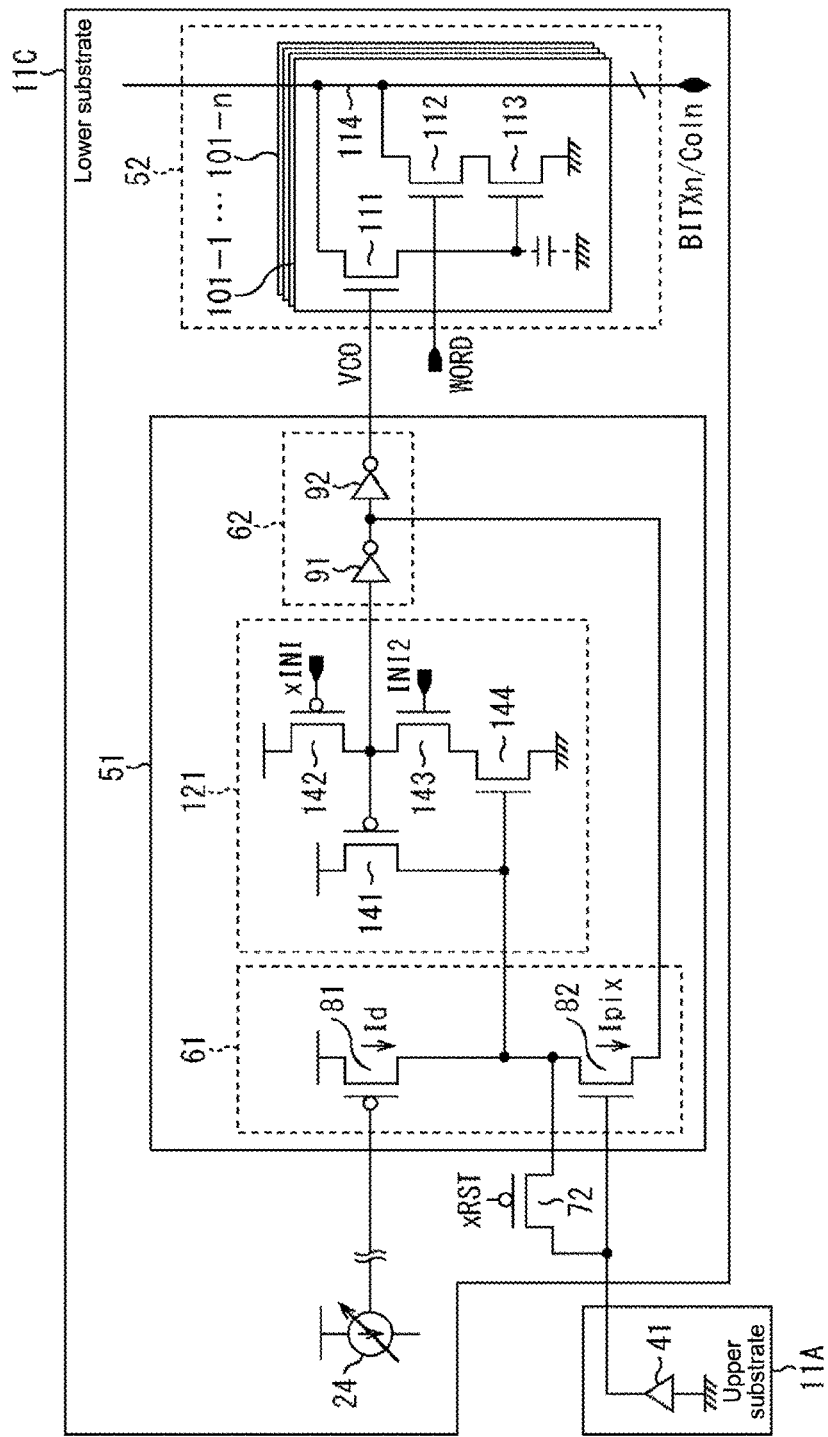
FIG. 19 is a diagram for describing an example constituted of the two semiconductor substrates.

FIG. 19 shows a first example of a circuit configuration formed on each of the upper substrate 11A and the lower substrate 11C.

At least the pixel circuit 41 is formed on the upper substrate 11A. At least the circuits of the ADC 42 (the comparison unit 51 and the latch unit 52) are formed on the lower substrate 11C.

It should be noted that the circuit configuration of FIG. 19 is a configuration applicable also to a case where the upper substrate 11A is made of, for example, a non-silicon material such as an organic photoelectric conversion layer.

Further, the circuit configuration of FIG. 19 is the circuit configuration showing the second embodiment of the pixel 21 of FIG. 7, but may also be a circuit configuration of other embodiments. For example, in a case where the circuit configuration includes the transfer gate 151 as shown in the third embodiment of the pixel 21 of FIG. 9, the transfer gate 151 is also included on the upper substrate 11A.

Figure 20:
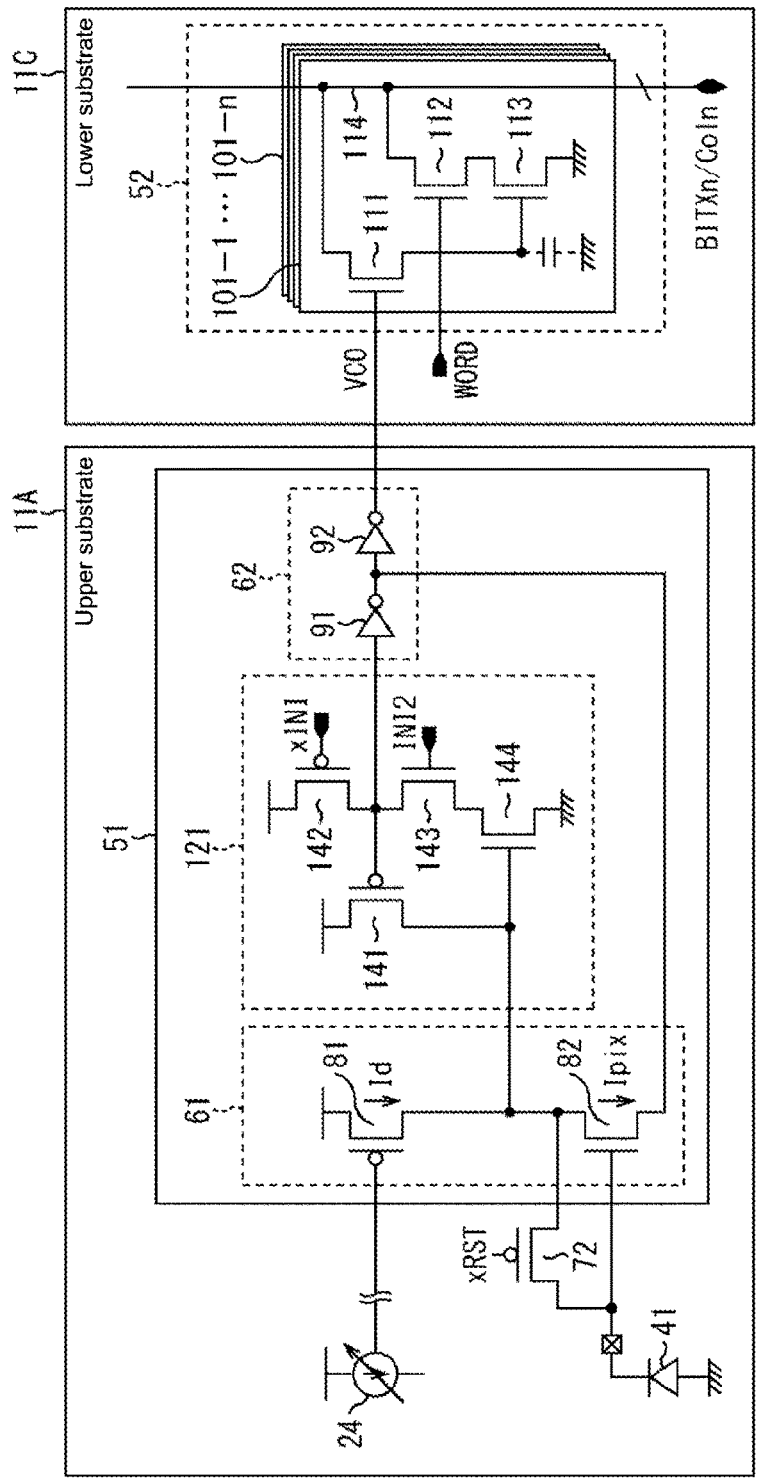
FIG. 20 is a diagram for describing an example constituted of the two semiconductor substrates.

FIG. 20 shows a second example of a circuit configuration formed on each of the upper substrate 11A and the lower substrate 11C.

At least the pixel circuit 41 and the circuit of the comparison unit 51 of the ADC 42 are formed on the upper substrate 11A. At least the circuit of the latch unit 52 of the ADC 42 is formed on the lower substrate 11C.

In the case of the example of FIG. 20, it is optimal to set the part of the photodiode 302 of the pixel circuit 41 on the upper substrate 11A to be a back-side-illumination-type light reception unit. Further, for the lower substrate 11C, if the circuit part of the latch unit 52 is separately produced by a dedicated fine process, costs can be cut down.

It should be noted that the circuit configuration of the example of FIG. 20 is also the circuit configuration showing the second embodiment of the pixel 21 of FIG. 7, but may also be a circuit configuration of other embodiments.

12. Second Embodiment of Multi-Substrate Configuration

FIGS. 18 to 20 are examples in which the solid-state imaging device 1 is constituted of the two semiconductor substrates 11, but the solid-state imaging device 1 can also be constituted of three semiconductor substrates 11.

Figure 21:
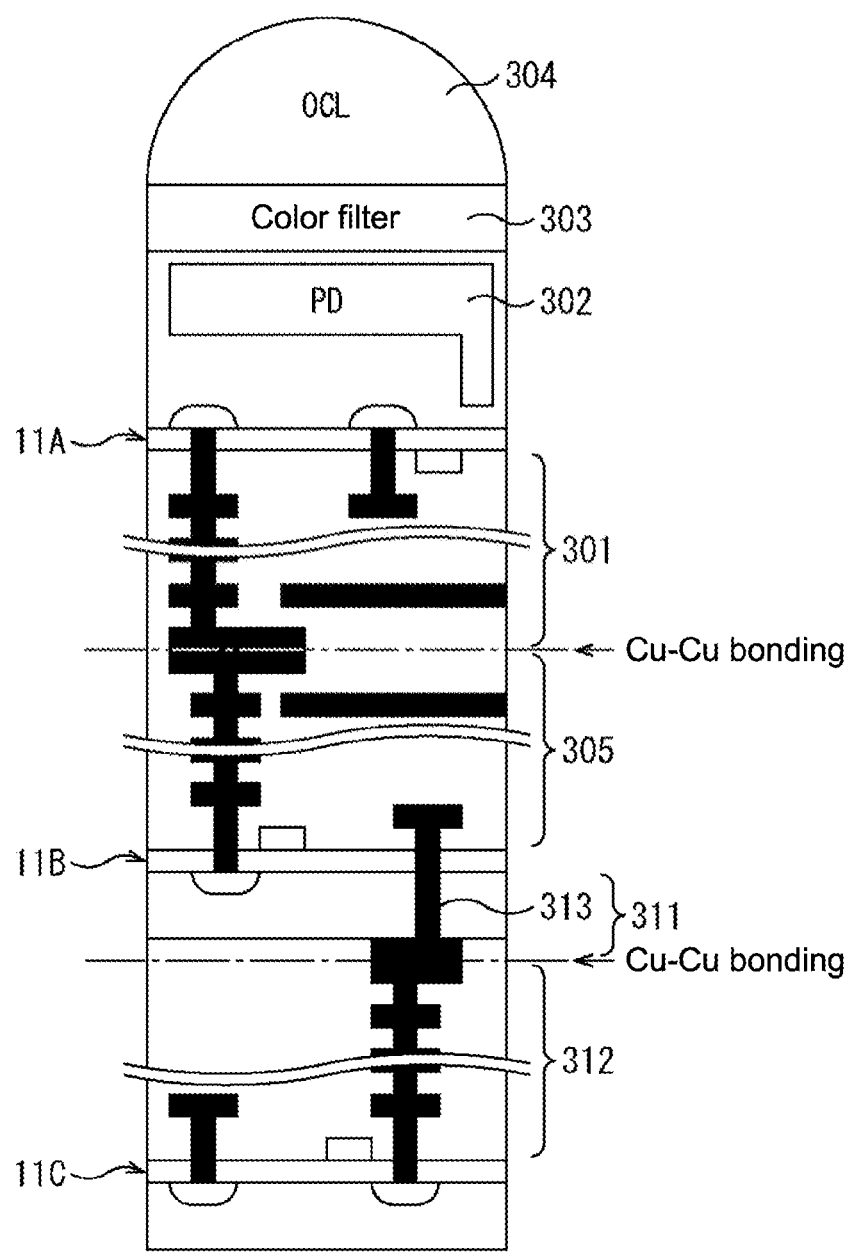
FIG. 21 is a diagram for describing an example constituted of three semiconductor substrates.

FIG. 21 shows a schematic cross-sectional diagram of a case where the solid-state imaging device 1 is constituted of the three semiconductor substrates 11.

The upper substrate 11A is of a back-side illumination type in which the photodiode 302, the color filter 303, the OCL 304, and the like are formed on the back surface side opposite to the front surface side on which the wiring layer 301 is formed.

The wiring layer 301 of the upper substrate 11A is attached to the wiring layer 305 on the front surface side of an intermediate substrate 11B by Cu—Cu bonding.

The intermediate substrate 11B and the lower substrate 11C are attached to each other by Cu—Cu bonding of a wiring layer 312, which is formed on the front surface side of the lower substrate 11C, and connection wiring 311 of the intermediate substrate 11B. The connection wiring 311 of the intermediate substrate 11B is connected to the wiring layer 305 on the front surface side of the intermediate substrate 11B by a through-electrode 313.

In the example of FIG. 21, the wiring layer 305 on the front surface side of the intermediate substrate 11B is bonded so as to face the wiring layer 301 of the upper substrate 11A, but the intermediate substrate 11B may be turned upside down such that the wiring layer 305 of the intermediate substrate 11B is bonded so as to face the wiring layer 312 of the lower substrate 11C.

Figure 22:
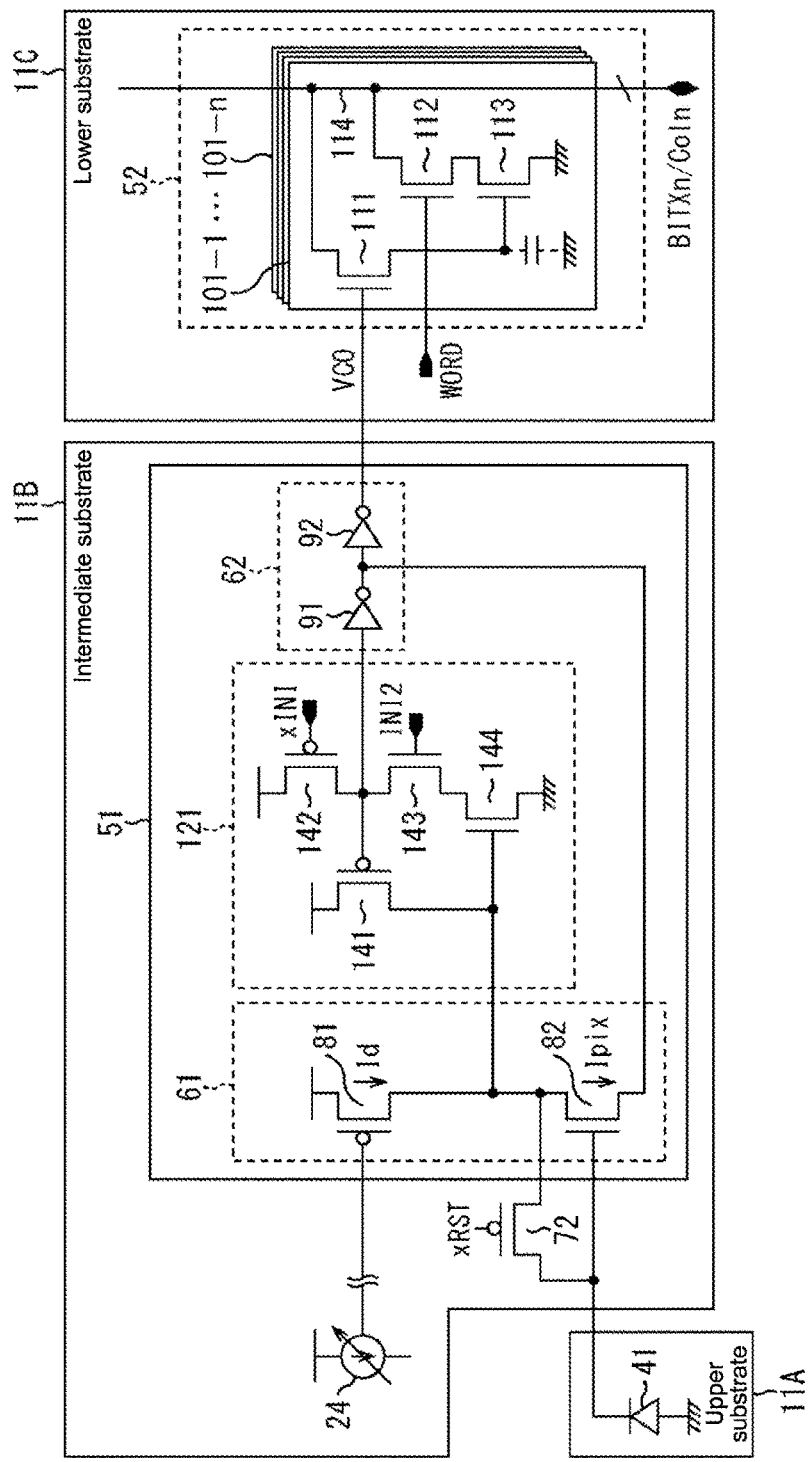
FIG. 22 is a diagram for describing an example constituted of the three semiconductor substrates.

FIG. 22 shows an example of a circuit configuration formed on each of the upper substrate 11A and the lower substrate 11C.

At least the pixel circuit 41 is formed on the upper substrate 11A. At least the circuit of the comparison unit 51 of the ADC 42 is formed on the intermediate substrate 11B. At least the circuit of the latch unit 52 of the ADC 42 is formed on the lower substrate 11C.

The circuit configuration of FIG. 22 is a configuration in which advantages of the circuit configuration of FIG. 19 and the circuit configuration of FIG. 20 are combined. In other words, it is possible to separately produce the pixel circuit 41 on the upper substrate 11A so as to include a high-sensitivity light-receiving element that is not made of silicon, and the comparison unit 51 of the present technology on the intermediate substrate 11B and the latch unit 52 on the lower substrate 11C by optimal processes for the structures thereof. For example, the Cu—CU bonding technology is applied to the attachment of each terminal, for example.

It should be noted that the circuit configuration of FIG. 22 is the circuit configuration showing the second embodiment of the pixel 21 of FIG. 7, but may also be a circuit configuration of other embodiments. For example, in a case where the circuit configuration includes the transfer gate 151 as shown in the third embodiment of the pixel 21 of FIG. 9, the transfer gate 151 is also included on the upper substrate 11A.

It should be noted that the above-mentioned separate production onto the semiconductor substrates is an example, and separate production may be performed on another configuration.

13. Output Control Example of Latch Circuit

Next, description will be given on read control of a latch signal Coln of the N pieces of latch circuits 101-1 to 101-N of the latch unit 52.

Figure 23:
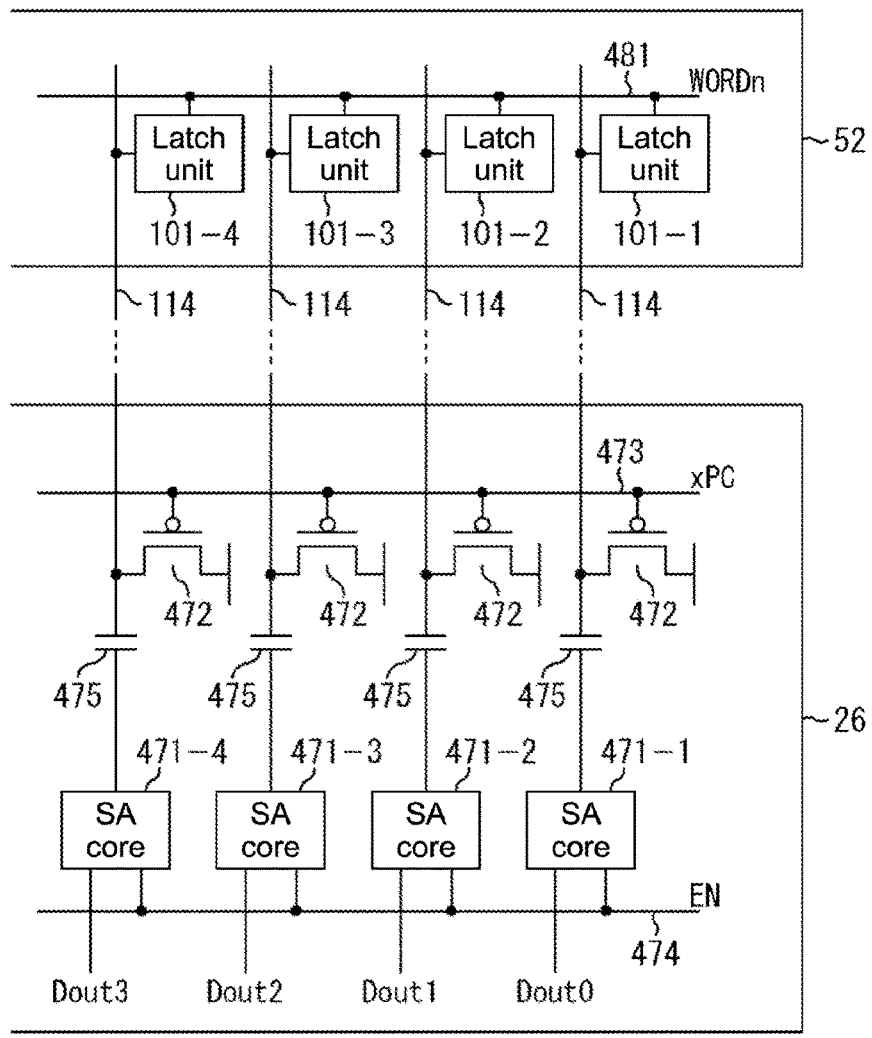
FIG. 23 is a diagram for describing output control of a latch circuit.

FIG. 23 is a circuit diagram on the read control of the latch unit 52 within each pixel 21 and the sense amplifier unit 26. Illustration of a circuit of write control is omitted.

As shown in FIG. 23, each of the N pieces of latch circuits 101 of the latch unit 52 is connected to an SA core (sense amplifier core circuit) 471 of the sense amplifier unit 26 via the latch signal output line 114.

A capacitor 475 connected to the latch signal output line 114 and a transistor 472 for pre-charging the capacitor 475 to a predetermined potential are disposed between the latch circuits 101 and the SA core 471.

For read of the latch signal Coln, before the read is performed, the capacitor 475 is pre-charged with a predetermined potential by the transistors 472, and the SA core 471 detects whether a potential of the pre-charged capacitor 475 is discharged by the latch signal Coln, so that the latch signal Coln is read. For example, if the latch signal Coln is "1", the pre-charged potential is discharged. If the latch signal Coln is "0", the pre-charged potential is held.

As shown in FIG. 23, in the solid-state imaging device 1, input is made to a WORD control line 481 that transmits the control signal WORD for read, an xPC control line 473 that transmits a control signal xPC to the transistor 472 that pre-charges the capacitor 475, and an EN control line 474 that transmits a control signal EN that controls a timing at which the SA core 471 detects the latch signal Coln are input.

With this configuration, the SA cores 471 perform a read operation and a pre-charge operation of the latch circuits 101.

Figure 24:
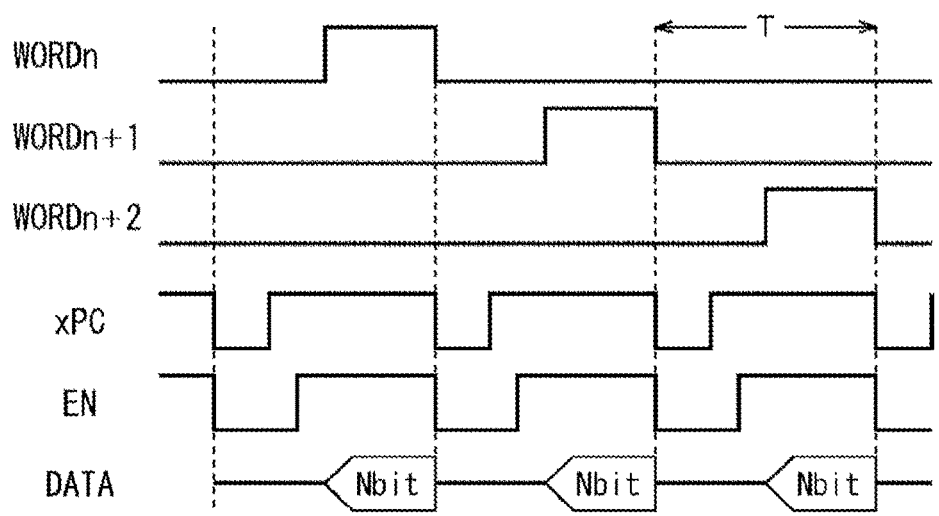
FIG. 24 is a timing chart for describing an operation of the output control of the latch circuit.

FIG. 24 is a timing chart of the latch unit 52 and the sense amplifier unit 26 shown in FIG. 23. A unit time spent for one read is assumed as T in the drive of simultaneously reading all bits in FIG. 25.

It should be noted that the example of the drive of reading all bits is shown in the examples of FIGS. 23 and 24, but interleaving drive in which odd-numbered bits and even-numbered bits are alternately read can also be performed, for example.

Further, in the example of FIG. 23, the SA core 471 may be constituted of an inverter, but may have a configuration (FIG. 25) proposed in, for example, "A High-Density 45 nm SRAM Using Small-Signal Non-Strobed Regenerative Sensing", Naveen Verma, Student Member, IEEE, and Anantha P. Chandrakasan, Fellow, IEEE.

Figure 25:
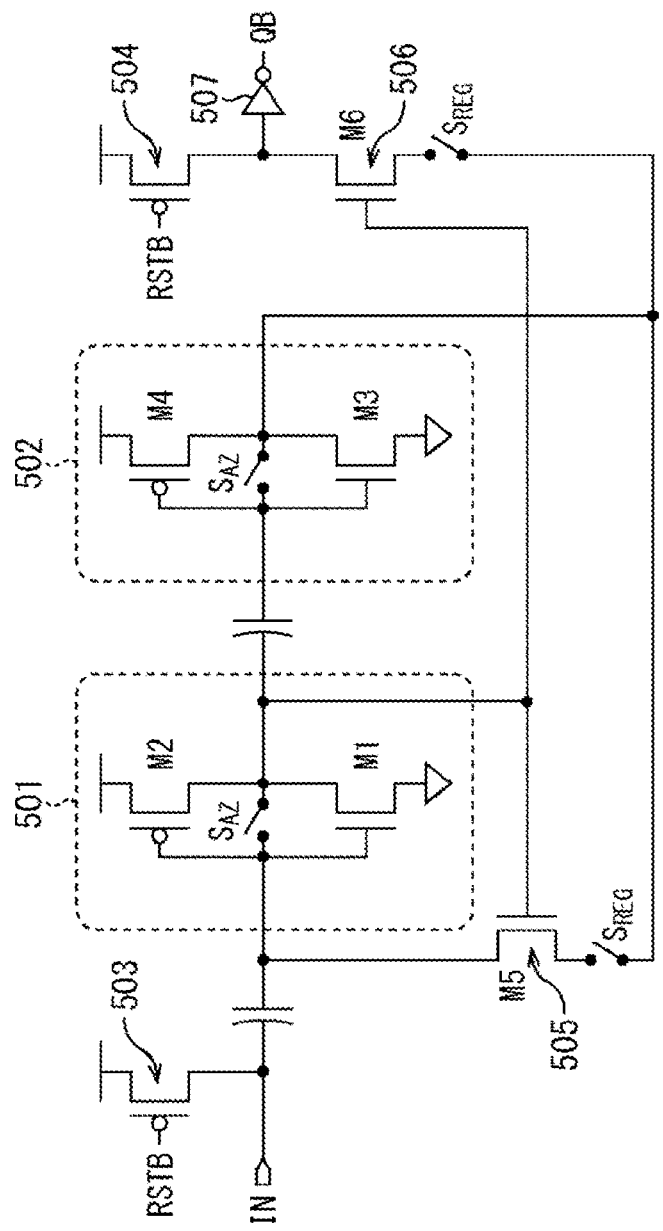
FIG. 25 is a block diagram showing a configuration example of an SA core.

FIG. 25 is a block diagram showing a configuration example of the SA core described above.

The SA core of FIG. 25 is configured to include two inverter amplifiers 501 and 502, reset transistors 503 and 504, a transistor 505 to be a regenerative feedback device, a transistor 506, and an inverter 507.

With such a configuration, a small signal can be amplified.

14. Usage Example of Image Sensor

Figure 26:
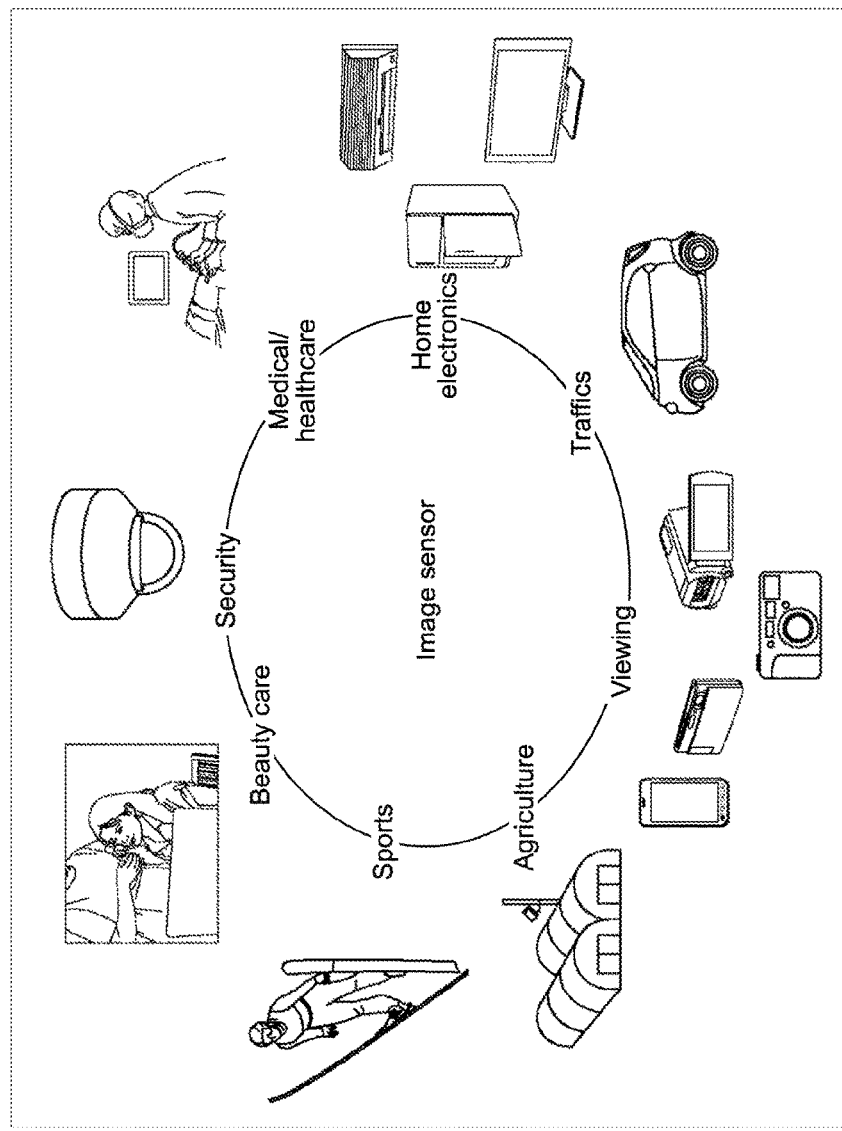
FIG. 26 is a diagram showing a usage example of an image sensor.

FIG. 26 is a diagram showing a usage example that uses the solid-state imaging device described above.

The solid-state imaging device (image sensor) described above can be used in various cases of sensing light such as visible light, infrared light, ultraviolet light, and X-rays as follows.

- An apparatus for photographing images to be viewed, such as a digital camera and a camera-equipped mobile apparatus
- An apparatus used for traffic purposes, such as a car-mounted sensor that photographs front/rear/periphery/inside of an automobile, a surveillance camera that monitors running vehicles and roads, and a distance measurement sensor that measures distances among vehicles, for safe driving including automatic stop, recognition of a driver's state, and the like
- An apparatus used in home electronics such as a TV, a refrigerator, and an air conditioner, for photographing gestures of users and executing apparatus operations according to the gestures An apparatus used for medical and healthcare purposes, such as an endoscope and an apparatus that performs blood vessel photographing by receiving infrared light An apparatus used for security purposes, such as a surveillance camera for crime-prevention purposes and a camera for person authentication purposes An apparatus used for beauty care purposes, such as a skin measurement apparatus that photographs skins and a microscope that photographs scalps An apparatus used for sports purposes, such as an action camera and a wearable camera for sports purposes An apparatus for agriculture purposes, such as a camera for monitoring a state of fields and crops 15. Example of Application to Electronic Apparatus The present disclosure is not limited to application to the solid-state imaging device. In other words, the present disclosure is applicable to general electronic apparatuses using the solid-state imaging device for an image capture unit (photoelectric conversion unit), e.g., an imaging apparatus such as a digital still camera and a video camera, a portable terminal apparatus having an imaging function, and a copying machine using the solid-state imaging device for an image read unit. The solid-state imaging device may have a form of one chip or a module-like form having an imaging function, in which an imaging unit and a signal processing unit or optical system are collectively packaged.

Figure 27:
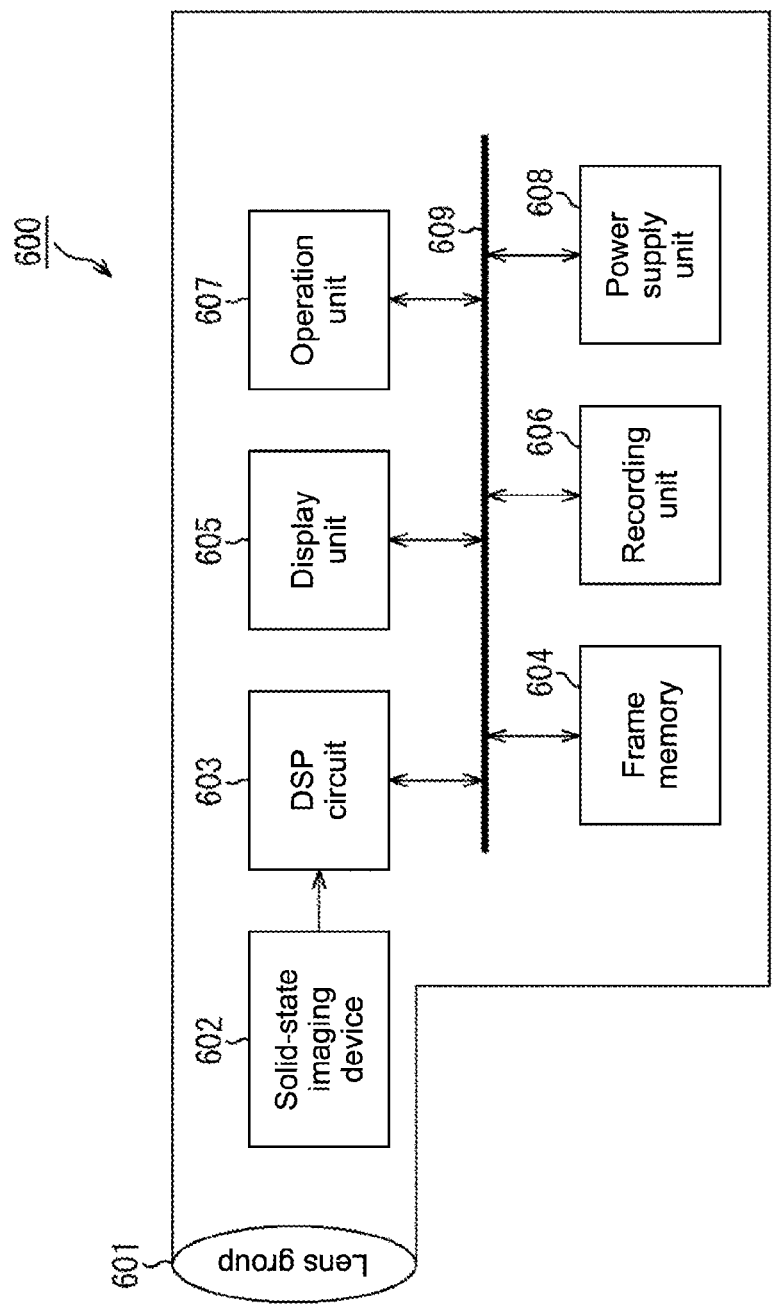
FIG. 27 is a block diagram showing a configuration example of an imaging apparatus as an electronic apparatus according to the present disclosure.

FIG. 27 is a block diagram showing a configuration example of an imaging apparatus as an electronic apparatus according to the present disclosure.

An imaging apparatus 600 of FIG. 27 includes an optical unit 601 including a lens group and the like, a solid-state imaging device (imaging device) 602 having a configuration of the solid-state imaging device 1 of FIG. 1, and a DSP (Digital Signal Processor) circuit 603 that is a camera signal processing circuit. Further, the imaging apparatus 600 also includes a frame memory 604, a display unit 605, a recording unit 606, an operation unit 607, and a power supply unit 608. The DSP circuit 603, the frame memory 604, the display unit 605, the recording unit 606, the operation unit 607, and the power supply unit 608 are connected to one another via a bus line 609.

The optical unit 601 takes in incident light coming from a subject (image light) and forms an image on an imaging surface of the solid-state imaging device 602. The solid-state imaging device 602 converts the amount of incident light, with which the image is formed on the imaging surface by the optical unit 601, into an electrical signal on a pixel-by-pixel basis and outputs the electrical signal as a pixel signal. As the solid-state imaging device 602, the solid-state imaging device 1 of FIG. 1, that is, a solid-state imaging device that reduces power consumption while suppressing reduction in sensitivity can be used.

The display unit 605 is constituted of, for example, a panel display device such as a liquid crystal panel or an organic EL (Electro Luminescence) panel and displays moving images or still images captured by the solid-state imaging device 602. The recording unit 606 records the moving images or still images captured by the solid-state imaging device 602 on a recording medium such as a hard disk and a semiconductor memory.

The operation unit 607 issues an operation instruction on various functions of the imaging apparatus 600 under operation of a user. The power supply unit 608 appropriately supplies various types of power, by which the DSP circuit 603, the frame memory 604, the display unit 605, the recording unit 606, and the operation unit 607 operate, to those supply targets.

As described above, when the solid-state imaging device 1 according to the embodiments described above is used as the solid-state imaging device 602, power consumption can be reduced while suppressing reduction in sensitivity. Therefore, also in the imaging apparatus 600 such as a video camera, a digital still camera, and additionally a camera module for a mobile device, e.g., a mobile phone, it is possible to suppress reduction in sensitivity and to achieve low power consumption.

It should be noted that the comparator 51 and the ADC 42 have been described as components incorporated in the solid-state imaging device 1 in the above, but can be products independently distributed (comparator, AD converter).

Further, the present disclosure is not limited to the solid-state imaging device and is applicable to general semiconductor devices including other semiconductor integrated circuits.

The embodiments of the present disclosure are not limited to the embodiments described above and can be variously modified without departing from the gist of the present disclosure.

As described above, the present disclosure can have a circuit configuration in which an electron is charge or can also have a circuit configuration in which a hole is charge, which has been described. Further, as described above, in each circuit configuration, a circuit configuration in which the polarities of the transistors (the NMOS transistor and the PMOS transistor) are replaced with each other can also be achieved. In that case, the control signal that is input to the transistor is a signal in which Hi and Low are inverted.

As described above, the reference signal REF may be a slope signal for which the voltage decreases such that the current Id for comparison monotonically decreases with the elapse of time, or the reference signal REF may be a slope signal for which the voltage increases such that the current Id for comparison monotonically decreases with the elapse of time. Further, the reference signal REF can be a fixed voltage irrespective of the elapsed time.

In addition to the above, a form in which all or part of the plurality of embodiments described above are combined can be employed. A form in which other embodiments that are not described in the embodiments described above are appropriately combined can also be achieved.

It should be noted that the effects described in this specification are merely exemplary ones and are not restrictive ones, and effects other than those described in this specification may be produced.

It should be noted that the present technology can have the following configurations.

(1) A solid-state imaging device, including on a pixel-to-pixel basis:

a comparison unit that receives light incident on a pixel, performs photoelectric conversion to generate a voltage, compares a current generated from the voltage with reference to a first potential line and a reference current generated with reference to a second potential line and having a converted voltage of a reference signal referred to for comparison with the current, the first potential line being one of a power supply line and a grounding line, the second potential line being another one of the power supply line and the grounding line, and returns a signal to a source side when the current is generated, the signal using a comparison result inverted when the current and the reference current become identical; and a storage unit that stores, as a digital value, a signal when the comparison result by the comparison unit is inverted.

(2) The solid-state imaging device according to (1), in which
the comparison unit includes an inverter circuit including a first transistor and a second transistor that are connected in series, the first transistor converting a voltage of the pixel signal to be input and generating a current, the second transistor converting a voltage of the reference signal to be input and generating the reference current.

(3) The solid-state imaging device according to (2), in which
the comparison unit further includes a logic circuit that returns, when comparison by the inverter circuit is started, low level as a signal using the comparison result, and returns, when the comparison result by the comparison unit is inverted, high level as a signal using the comparison result.

(4) The solid-state imaging device according to any one of (1) to (3), in which
the comparison unit further includes a positive feedback circuit that increases a change speed when the signal of the comparison result is inverted.

(5) The solid-state imaging device according to any one of (1) to (4), further including on a pixel-to-pixel basis
a transfer gate that transfers a signal from the photoelectric conversion unit.

(6) The solid-state imaging device according to any one of (1) to (5), in which
the storage unit is a dynamic latch.

(7) The solid-state imaging device according to any one of (1) to (5), in which
the storage unit is a static latch.

(8) The solid-state imaging device according to (2), in which
the first transistor is constituted of an NMOS (Negative Channel MOS (Metal-Oxide Semiconductor)), and the second transistor is constituted of a PMOS (Positive Channel MOS).

(9) The solid-state imaging device according to (2), in which
the first transistor is constituted of a PMOS (Positive Channel MOS), and the second transistor is constituted of an NMOS (Negative Channel MOS).

(10) The solid-state imaging device according to (7), in which
when the hole is assumed as charge, a polarity of the positive feedback circuit is a reverse polarity in a case where an electron is assumed as charge.

(11) The solid-state imaging device according to any one of (1) to (10), which is constituted of a plurality of semiconductor substrates.

(12) An electronic apparatus, including:
a solid-state imaging device including, on a pixel-to-pixel basis, a comparison unit and a storage unit,
the comparison unit receiving light incident on a pixel, performing photoelectric conversion to generate a voltage, comparing a current generated from the voltage with reference to a first potential line and a reference current generated with reference to a second potential line and having a converted voltage of a reference signal referred to for comparison with the current, the first potential line being one of a power supply line and a grounding line, the second potential line being another one of the power supply line and the grounding line, and returning a signal to a source side when the current is generated, the signal using a comparison result inverted when the current and the reference current become identical,
the storage unit storing, as a digital value, a signal when the comparison result by the comparison unit is inverted;
a signal processing circuit that processes an output signal output from the solid-state imaging device; and
an optical system that inputs incident light to the solid-state imaging device.

REFERENCE SIGNS LIST 1 solid-state imaging device
11 semiconductor substrate
11A upper substrate
11B intermediate substrate
11C lower substrate
21 pixel (unit)
24 DAC
26 sense amplifier unit
41 pixel circuit
42 ADC
51 comparator
52 latch unit
61 current comparison unit
62 feedback unit
72 reset transistor
81, 82 transistor
91, 92 inverter
600 camera apparatus
602 solid-state imaging device
101, 101-1 to 101-N latch circuit
111 to 113 transistor
114 latch signal output line
121 positive feedback circuit
transistor 141 to 144 transistor
151 transfer gate
171, 171-1 to 171-N latch circuit
181 multiplexer
182 static latch
183 latch signal output line
191 NOR circuit
192, 193 inverter
211, 212 transistor
231 to 234 transistor
301 wiring layer
302 photodiode
303 color filter
304 OCL
305 wiring layer
311 connection wiring
312 wiring layer
471 SA core
472 transistor
473 xPC control line
474 EN control line
475 capacitor
481 WORD control line
501, 502 inverter amplifier
503, 504 reset transistor
505, 506 transistor
507 inverter
600 imaging apparatus
601 optical unit
602 solid-state imaging device
603 DSP circuit

What is claimed is:

1. A solid-state imaging device, comprising on a pixel-to-pixel basis:
a comparison unit that receives light incident on a pixel, performs photoelectric conversion to generate a voltage, compares a current generated from the voltage with reference to a first potential line and a reference current generated with reference to a second potential line and having a converted voltage of a reference signal referred to for comparison with the current, the first potential line being one of a power supply line and a grounding line, the second potential line being another one of the power supply line and the grounding line, and returns a signal to a source side when the current is generated, the signal using a comparison result inverted when the current and the reference current become identical; and
a storage unit that stores, as a digital value, a signal when the comparison result by the comparison unit is inverted.

2. The solid-state imaging device according to claim 1, wherein the comparison unit includes an inverter circuit including a first transistor and a second transistor that are connected in series, the first transistor converting a voltage of the pixel signal to be input and generating a current, the second transistor converting a voltage of the reference signal to be input and generating the reference current.

3. The solid-state imaging device according to claim 2, wherein the comparison unit further includes a logic circuit that returns, when comparison by the inverter circuit is started, low level as a signal using the comparison result, and returns, when the comparison result by the comparison unit is inverted, high level as a signal using the comparison result.

4. The solid-state imaging device according to claim 1, wherein the comparison unit further includes a positive feedback circuit that increases a change speed when the signal of the comparison result is inverted.

5. The solid-state imaging device according to claim 1, further comprising on a pixel-to-pixel basis a transfer gate that transfers a signal from the photoelectric conversion unit.

6. The solid-state imaging device according to claim 1, wherein the storage unit is a dynamic latch.

7. The solid-state imaging device according to claim 1, wherein the storage unit is a static latch.

8. The solid-state imaging device according to claim 2, wherein the first transistor is constituted of an NMOS (Negative Channel MOS (Metal-Oxide Semiconductor)), and the second transistor is constituted of a PMOS (Positive Channel MOS).

9. The solid-state imaging device according to claim 2, wherein the first transistor is constituted of a PMOS (Positive Channel MOS), and the second transistor is constituted of an NMOS (Negative Channel MOS).

10. The solid-state imaging device according to claim 2, wherein when the hole is assumed as charge, a polarity of the positive feedback circuit is a reverse polarity in a case where an electron is assumed as charge.

11. The solid-state imaging device according to claim 1, which is constituted of a plurality of semiconductor substrates.

12. An electronic apparatus, comprising:
a solid-state imaging device including, on a pixel-to-pixel basis, a comparison unit and a storage unit,
the comparison unit receiving light incident on a pixel, performing photoelectric conversion to generate a voltage, comparing a current generated from the voltage with reference to a first potential line and a reference current generated with reference to a second potential line and having a converted voltage of a reference signal referred to for comparison with the current, the first potential line being one of a power supply line and a grounding line, the second potential line being another one of the power supply line and the grounding line, and returning a signal to a source side when the current is generated, the signal using a comparison result inverted when the current and the reference current become identical,
the storage unit storing, as a digital value, a signal when the comparison result by the comparison unit is inverted;
a signal processing circuit that processes an output signal output from the solid-state imaging device; and
an optical system that inputs incident light to the solid-state imaging device.

* * * * *